United States Patent
Uragami et al.

(10) Patent No.: US 11,322,057 B2
(45) Date of Patent: May 3, 2022

(54) IMAGE DISPLAY DEVICE AND DRIVING DEVICE

(71) Applicant: Panasonic Intellectual Property Management Co., Ltd., Osaka (JP)

(72) Inventors: Susumu Uragami, Osaka (JP); Yuta Yamamoto, Kyoto (JP); Hiroyuki Furuya, Osaka (JP); Yoshiro Kashiwabara, Aichi (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/103,771

(22) Filed: Nov. 24, 2020

(65) Prior Publication Data

US 2021/0082326 A1    Mar. 18, 2021

Related U.S. Application Data

(63) Continuation of application No. PCT/JP2019/012347, filed on Mar. 25, 2019.

(30) Foreign Application Priority Data

Jun. 27, 2018    (JP) .............................. JP2018-121930

(51) Int. Cl.
*G09G 3/00* (2006.01)
*B60K 35/00* (2006.01)
*G02B 27/01* (2006.01)

(52) U.S. Cl.
CPC .............. *G09G 3/001* (2013.01); *B60K 35/00* (2013.01); *G02B 27/0101* (2013.01);
(Continued)

(58) Field of Classification Search
CPC .... G09G 3/001; G09G 3/025; G09G 2380/10; G09G 2354/00; B60K 35/00;
(Continued)

(56) References Cited

U.S. PATENT DOCUMENTS

| 2009/0160736 | A1* | 6/2009 | Shikita ............... | G02B 27/0101 345/7 |
| 2017/0059861 | A1* | 3/2017 | Furuya ............... | G02B 27/0101 |
| 2020/0055395 | A1* | 2/2020 | Nakamura ............. | B60K 35/00 |

FOREIGN PATENT DOCUMENTS

| JP | S60-005306 A | 1/1985 |
| JP | H01-194884 A | 8/1989 |

(Continued)

OTHER PUBLICATIONS

International Search Report issued in corresponding International Patent Application No. PCT/JP2019/012347, dated Jun. 18, 2019, wiht English translation.

*Primary Examiner* — Brent D Castiaux
(74) *Attorney, Agent, or Firm* — McDermott Will & Emery LLP

(57) ABSTRACT

An image display device includes: a light source; a screen on which an image is formed when light from the light source is applied thereto; an optical system configured to generate a virtual image by light from the screen; an actuator configured to move the screen in an optical axis direction; a position detector configured to detect a movement position of the screen; a servo circuit configured to cause the movement of the screen by the actuator to follow a target waveform on the basis of a signal from the position detector; and a correction circuit configured to reduce a deviation between a timing to move the screen by the servo circuit and a timing to form the image on the screen.

10 Claims, 21 Drawing Sheets

(52) U.S. Cl.
CPC .. *G02B 27/0149* (2013.01); *B60K 2370/1529* (2019.05); *B60K 2370/23* (2019.05); *B60K 2370/52* (2019.05); *G02B 2027/0127* (2013.01); *G02B 2027/0141* (2013.01); *G02B 2027/0154* (2013.01); *G09G 2380/10* (2013.01)

(58) Field of Classification Search
CPC ........ B60K 2370/1529; B60K 2370/52; B60K 2370/23; B60K 2370/178; B60K 2370/193; B60K 2370/31; G02B 27/0101; G02B 27/0149; G02B 27/0141; G02B 27/0154; G02B 27/0127; H04N 5/74; H04N 13/128; H04N 13/346; H04N 13/363; H04N 13/398
See application file for complete search history.

(56) References Cited

FOREIGN PATENT DOCUMENTS

| | | |
|---|---|---|
| JP | H01-272912 A | 10/1989 |
| JP | H07-295652 A | 11/1995 |
| JP | 2003-330545 A | 11/2003 |
| JP | 2009-150947 A | 7/2009 |
| WO | WO2018/079794 A1 * | 3/2018 |
| WO | 2018/079794 A1 | 5/2018 |

* cited by examiner

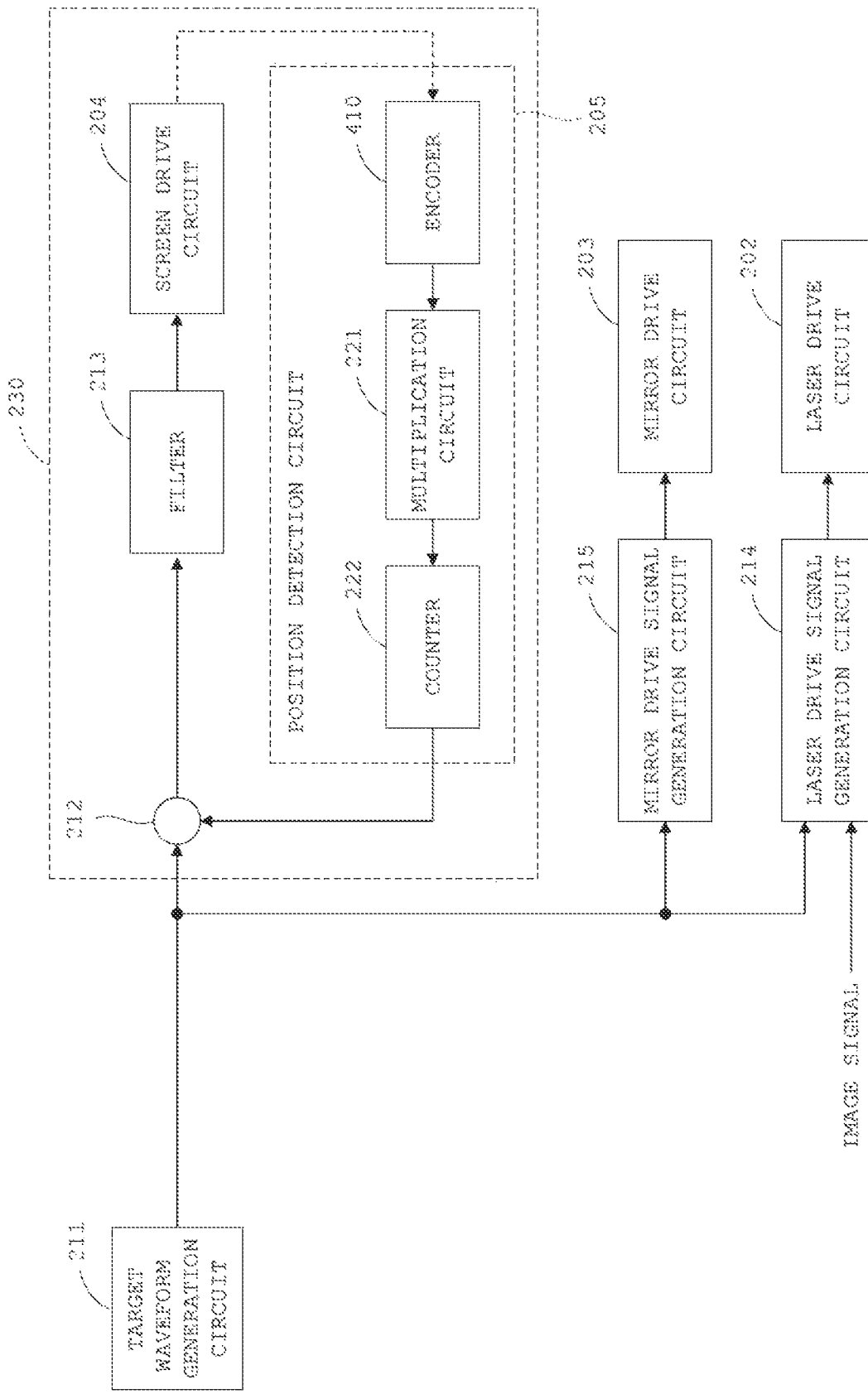
Fig. 8 COMPARATIVE EXAMPLE 1

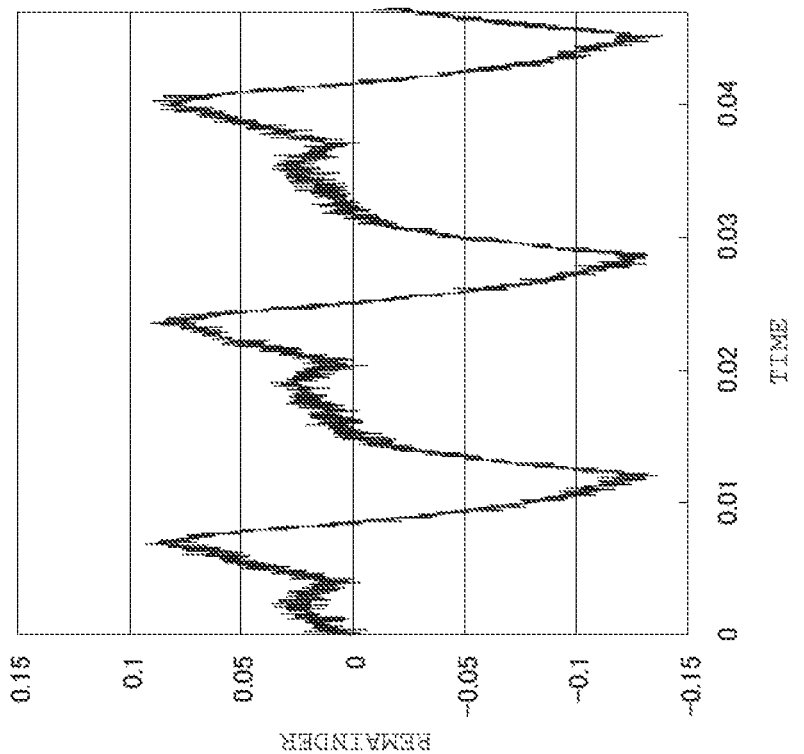
Fig. 9A COMPARATIVE EXAMPLE 1
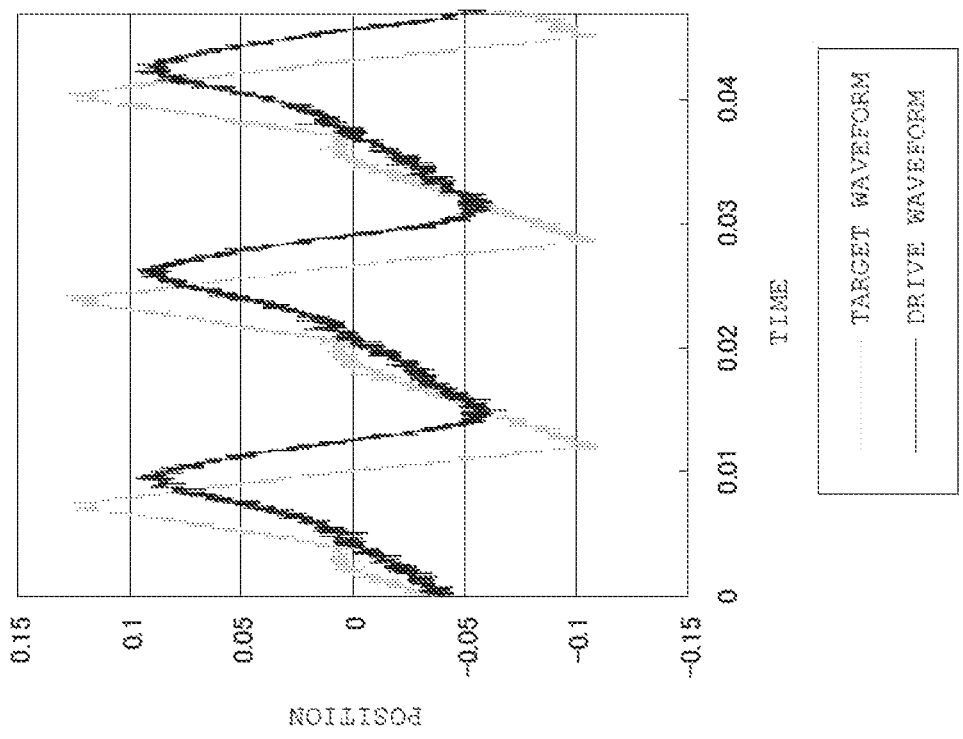
Fig. 9B COMPARATIVE EXAMPLE 1

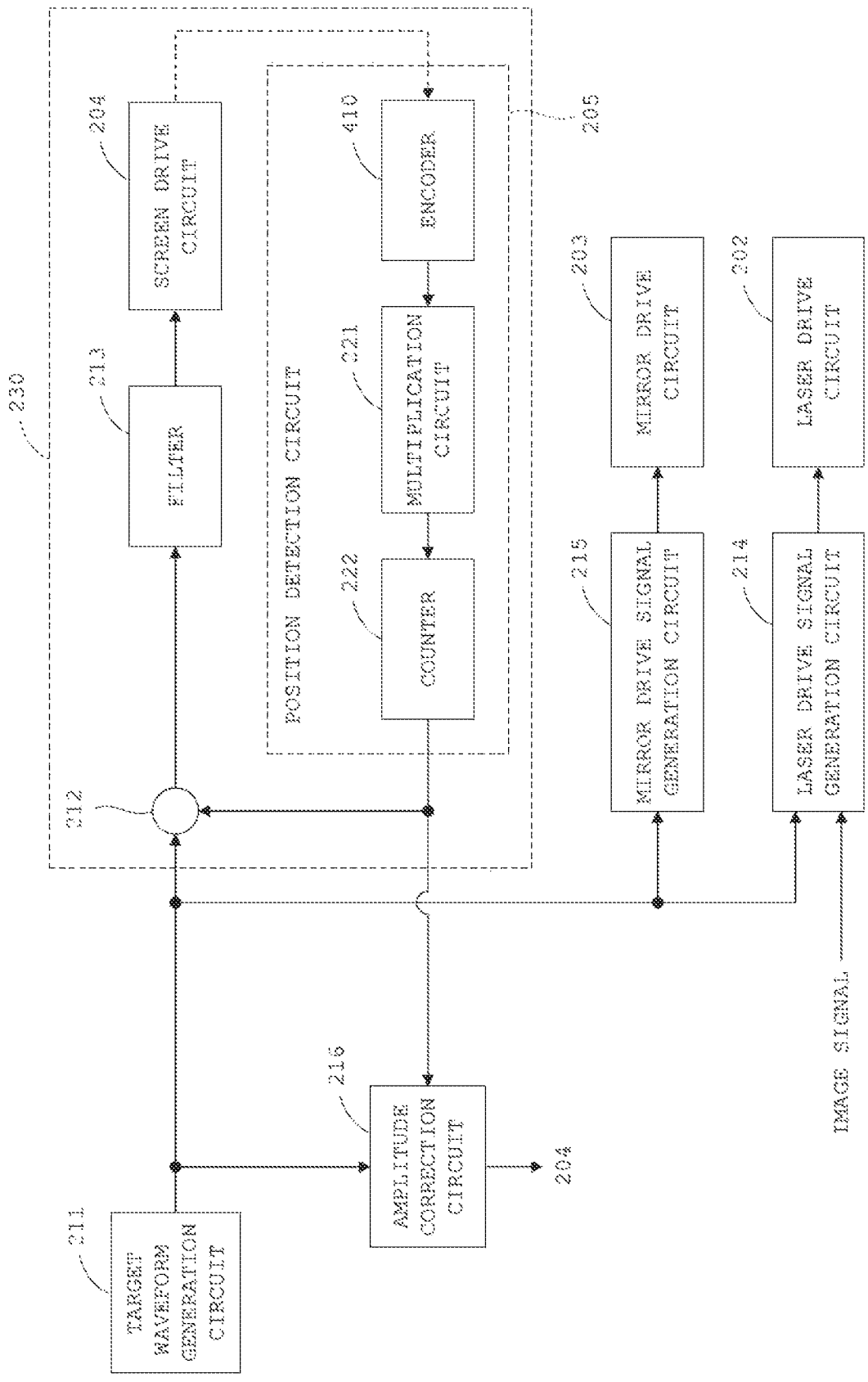
Fig. 10 COMPARATIVE EXAMPLE 2

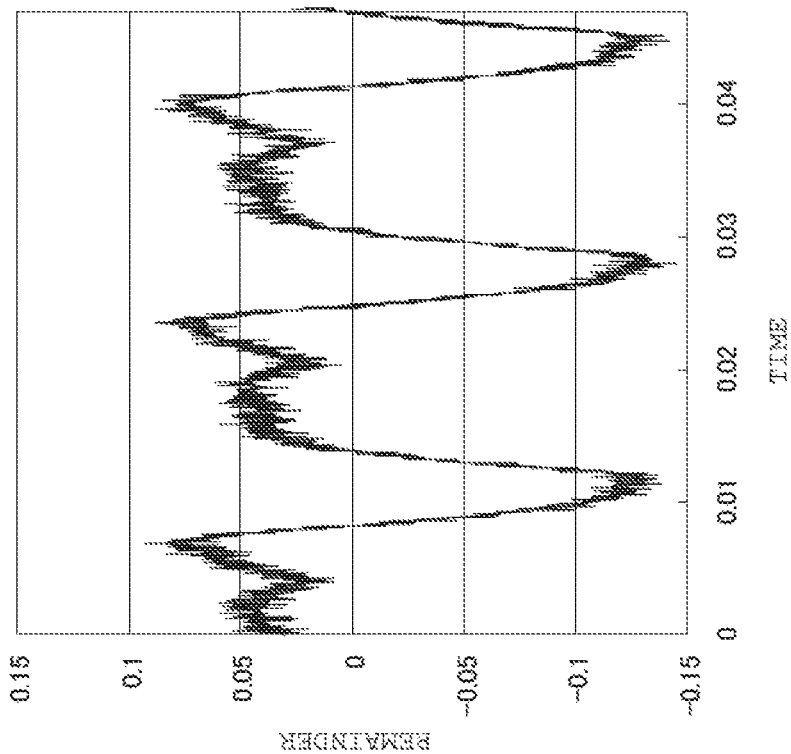
Fig. 11A COMPARATIVE EXAMPLE 2
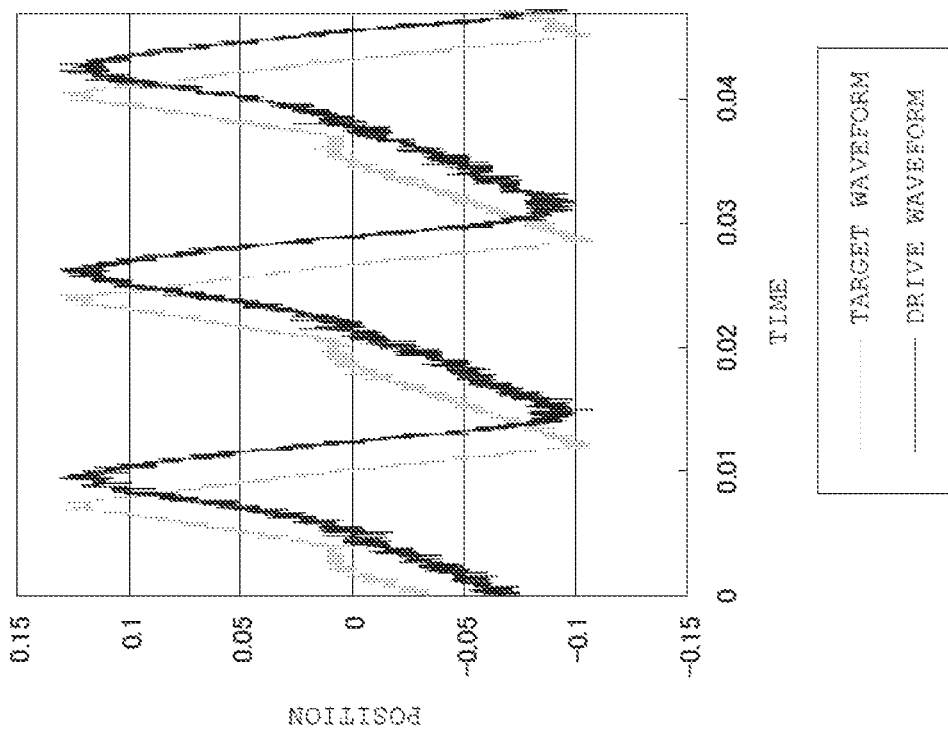
Fig. 11B COMPARATIVE EXAMPLE 2

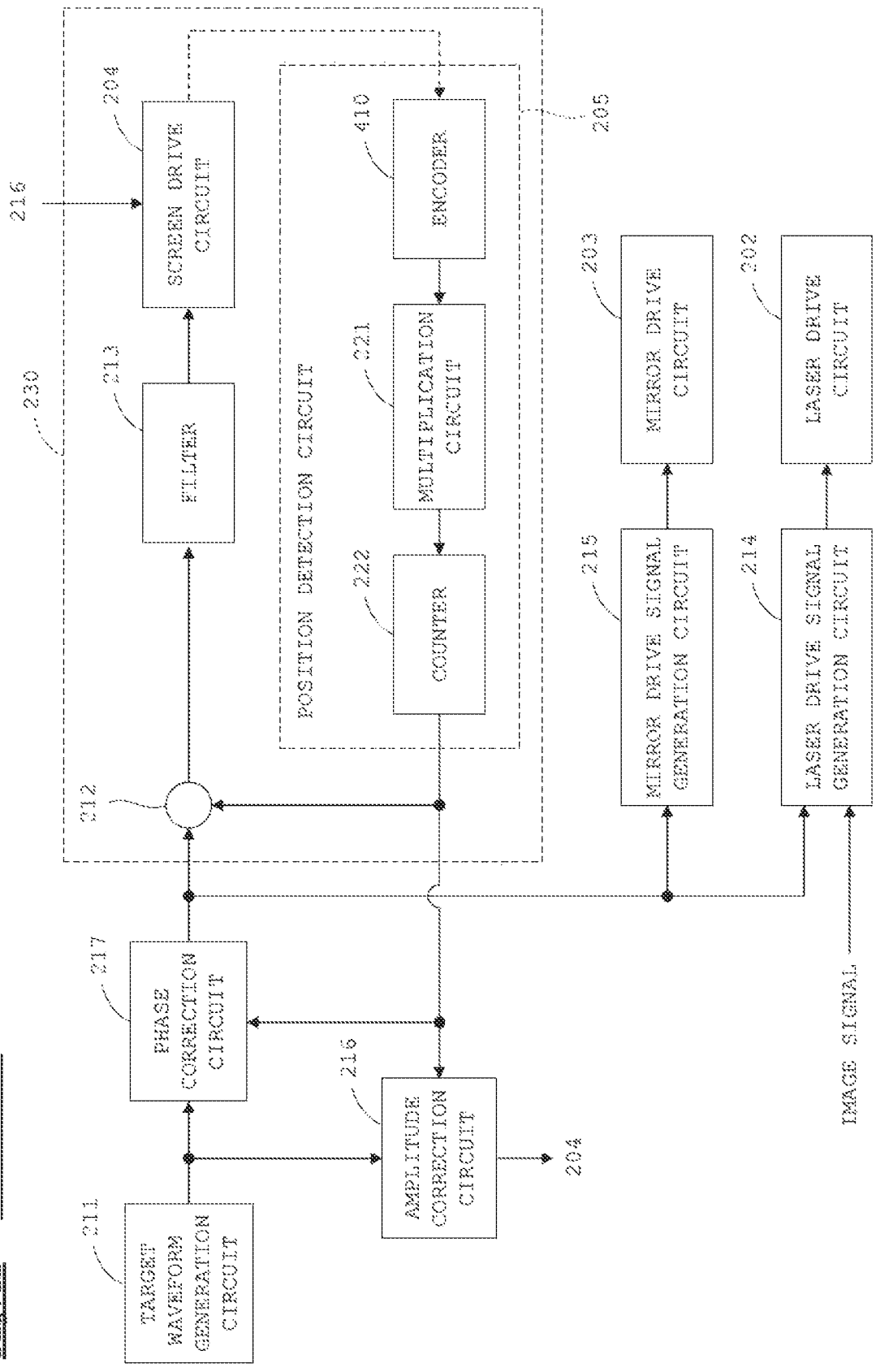
Fig. 12  EMBODIMENT 1

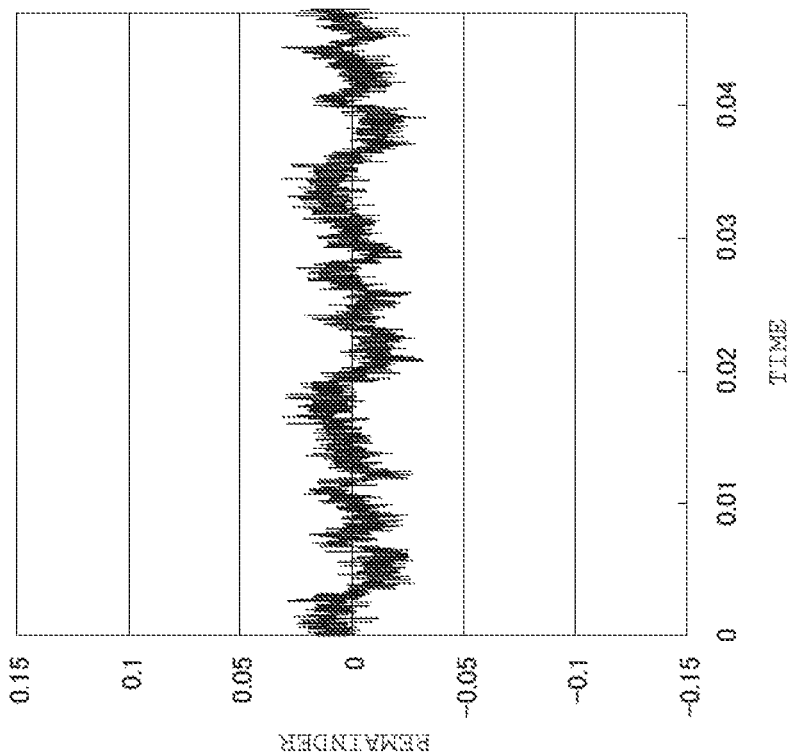
Fig. 13A  EMBODIMENT 1
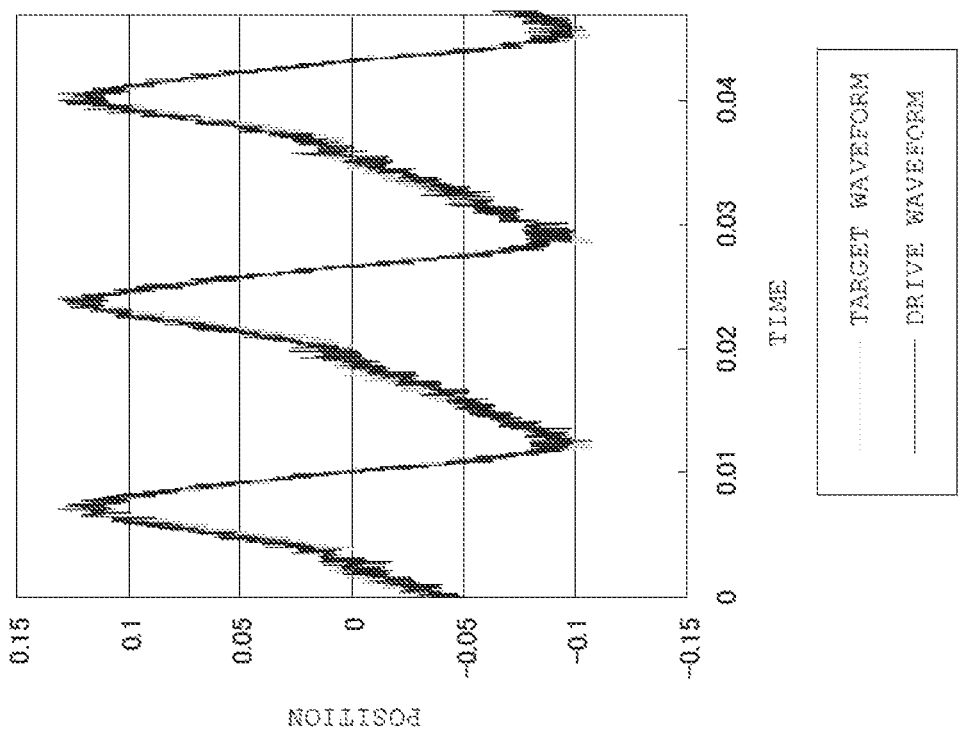
Fig. 13B  EMBODIMENT 1

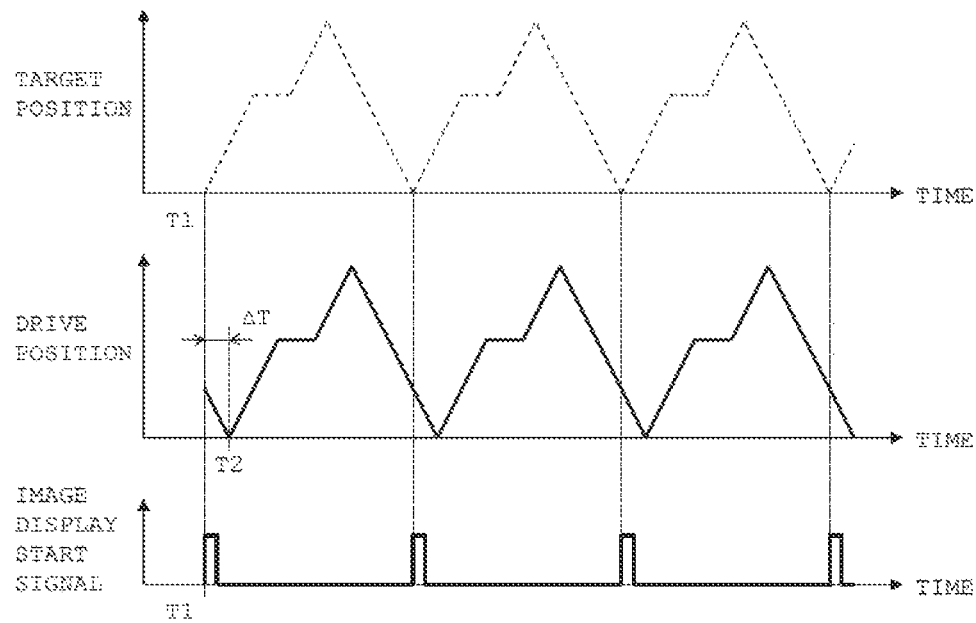
Fig. 14A BEFORE PHASE CORRECTION (COMPARATIVE EXAMPLE 2)
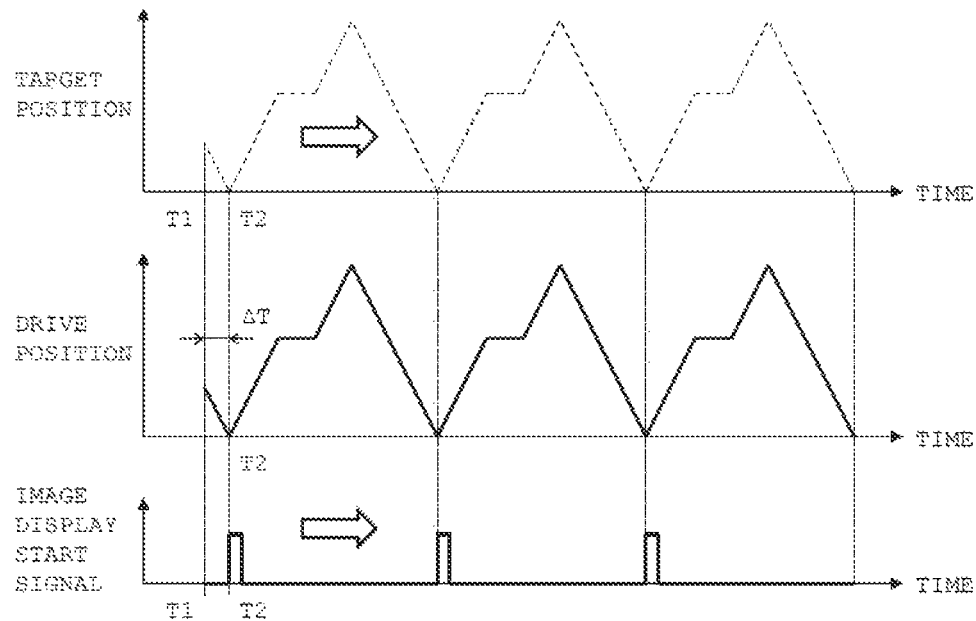
Fig. 14B AFTER PHASE CORRECTION (EMBODIMENT 1)

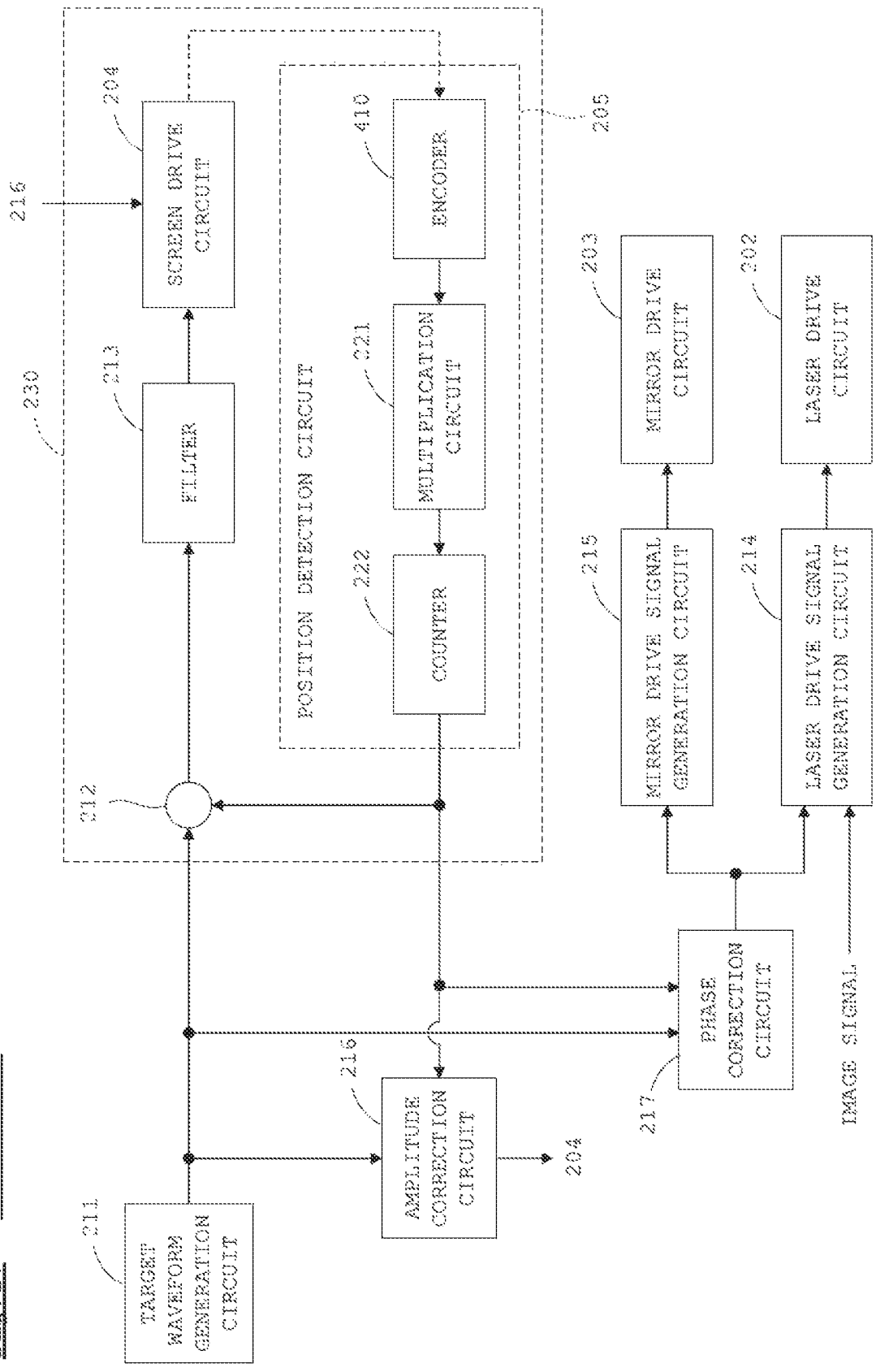
Fig. 17 EMBODIMENT 2

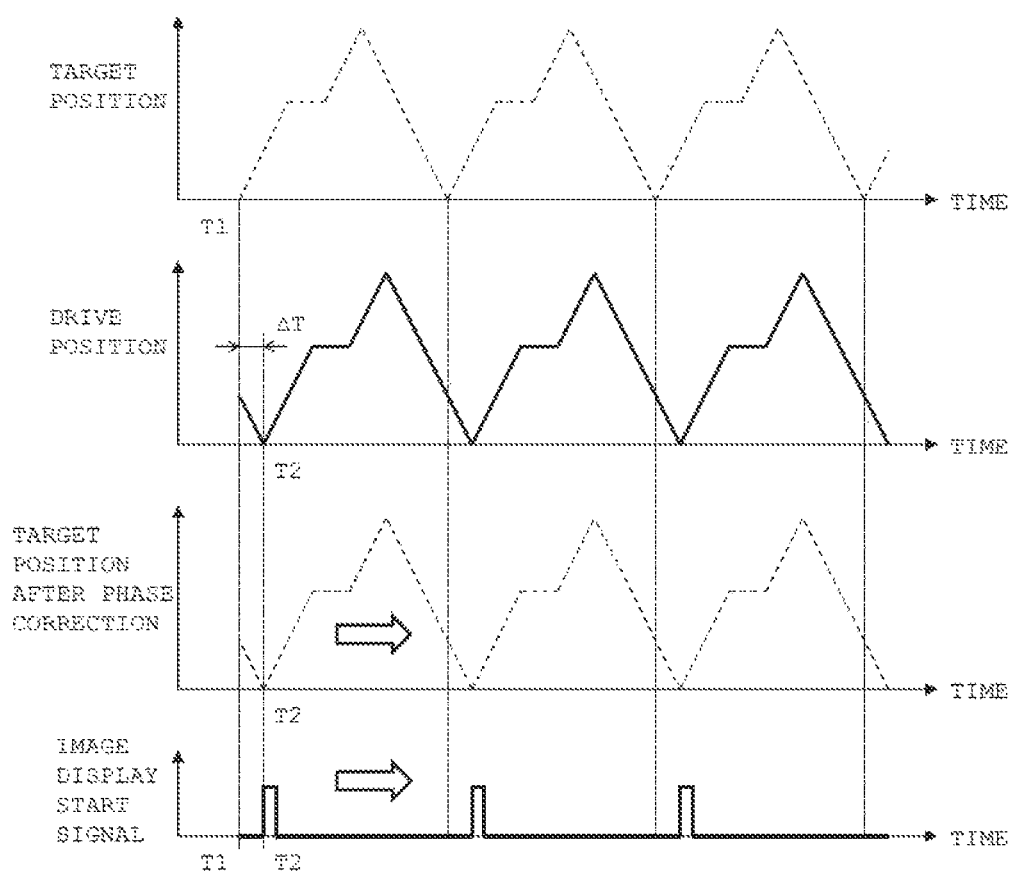

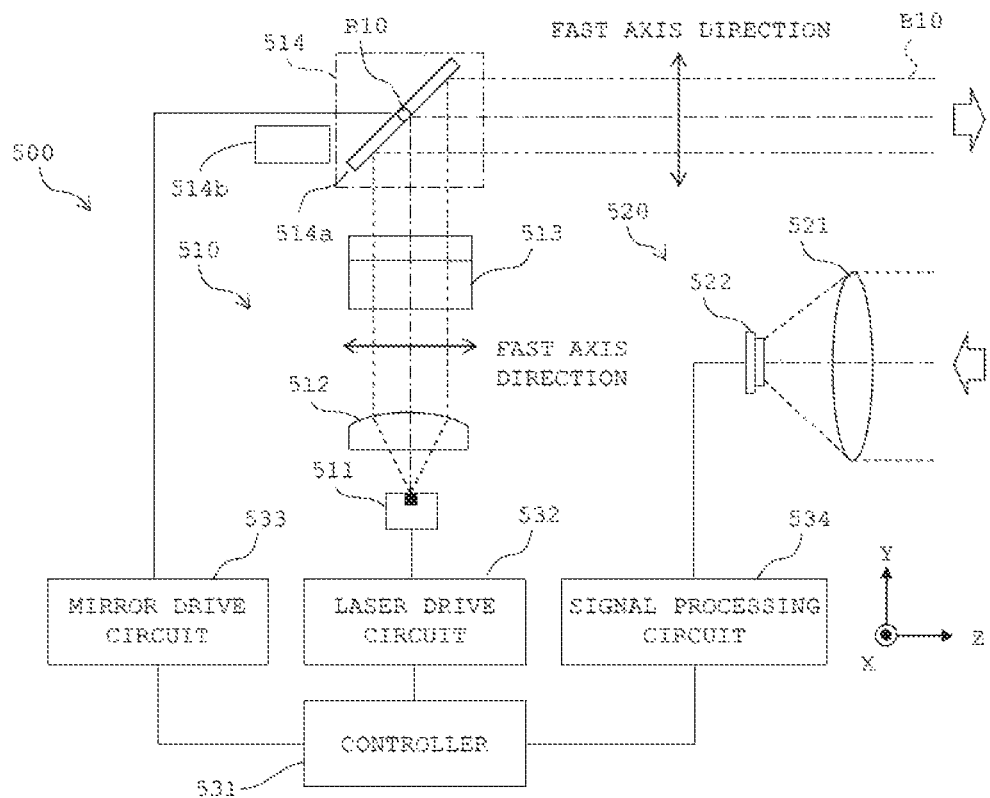
Fig. 19A  EMBODIMENT 3
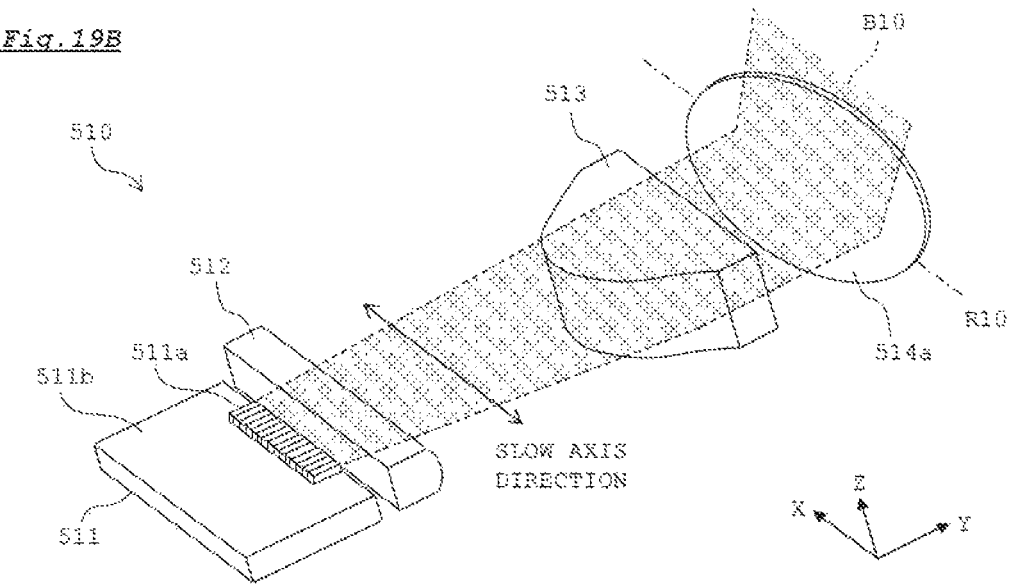
Fig. 19B

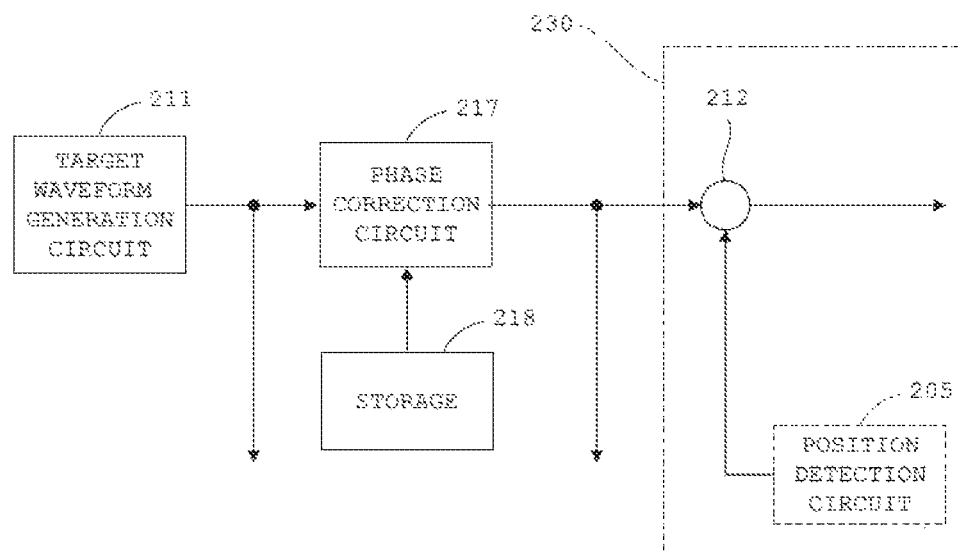
Fig. 21A  MODIFICATION OF EMBODIMENT 1
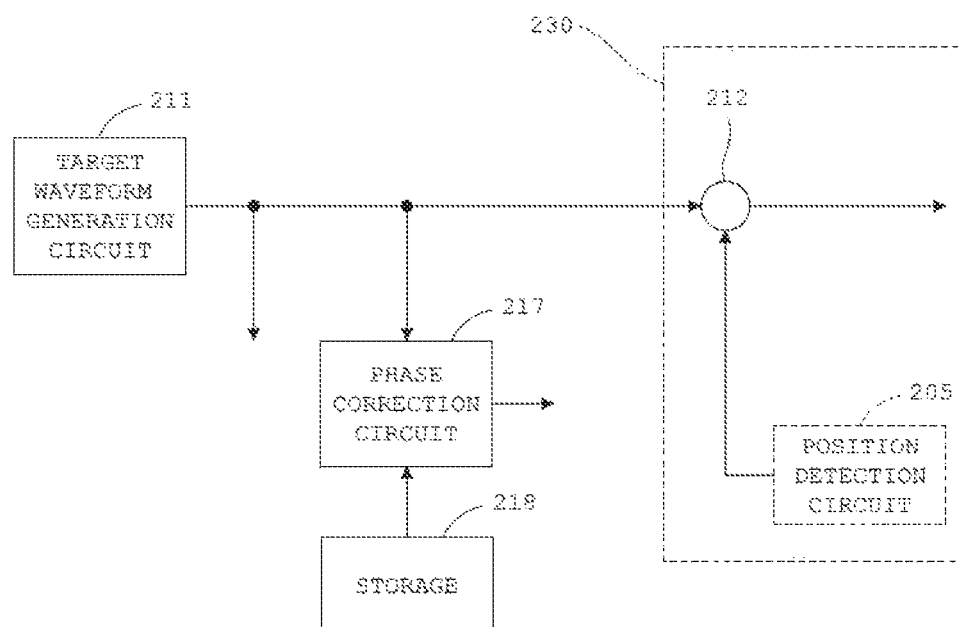
Fig. 21B  MODIFICATION OF EMBODIMENT 2

IMAGE DISPLAY DEVICE AND DRIVING DEVICE

CROSS REFERENCE TO RELATED APPLICATION

This application is a continuation of International Application No. PCT/JP2019/12347 filed on Mar. 25, 2019, entitled "IMAGE DISPLAY DEVICE AND DRIVING DEVICE", which claims priority under 35 U.S.C. Section 119 of Japanese Patent Application No. 2018-121930 filed on Jun. 27, 2018, entitled "IMAGE DISPLAY DEVICE". The disclosure of the above applications is incorporated herein by reference.

BACKGROUND OF THE INVENTION

1. Field of the Invention

The present invention relates to an image display device and a driving device that are, for example, suitable to be mounted on a moving body such as a passenger car.

2. Disclosure of Related Art

In recent years, an image display device referred to as a head-up display has been developed and mounted on a moving body such as a passenger car. In a head-up display mounted on a passenger car, light modulated by image information is projected toward a windshield, and the reflected light is applied to the eyes of a driver. Accordingly, the driver is allowed to see a virtual image as an image in front of the windshield. For example, the vehicle speed, the outside temperature, etc., are displayed as a virtual image. Recently, it has also been considered to display a navigation image or an image that alerts of passers-by as a virtual image.

In the above head-up display, a laser light source such as a semiconductor laser can be used as a light source for generating a virtual image. In this configuration, scanning is performed on a screen with laser light while the laser light is modulated in accordance with an image signal. At the screen, the laser light is diffused, and the region of the light applied to the eyes of the driver is expanded. Accordingly, even when the driver slightly moves their head, their eyes do not come out of the irradiation region, and the driver is allowed to favorably and stably see an image (virtual image).

Japanese Laid-Open Patent Publication No. 2009-150947 describes a configuration in which a screen is moved in an optical axis direction to change the image-formation position of a virtual image in the front-rear direction. In this configuration, the screen is driven using a motor, a feed screw, and a rack.

With a head-up display using a screen, an image whose viewing distance is changed in the depth direction can be displayed by moving the screen in an optical axis direction at high speed. On the other hand, with a configuration for driving a screen by a motor, a feed screw, and a rack as in the above configuration of Japanese Laid-Open Patent Publication No. 2009-150947, the screen cannot be moved at high speed, and thus an image whose viewing distance is changed cannot be smoothly displayed.

As a configuration for moving a screen at high speed, for example, a drive mechanism based on a VCM (Voice Coil Motor) method can be used. With this configuration, an image whose viewing distance is changed in the depth direction can be displayed by drawing an image on the screen in synchronization with movement of the screen. In this case, servo control is performed such that the position of the screen follows a target position that changes over time. However, in this servo control, the actual screen position follows the target position with a predetermined time lag. Therefore, a problem that the image cannot be displayed at an appropriate viewing distance, arises.

SUMMARY OF THE INVENTION

A first aspect of the present invention is directed to an image display device. The image display device according to this aspect includes: a light source; a screen on which an image is formed when light from the light source is applied thereto; an optical system configured to generate a virtual image by light from the screen; an actuator configured to move the screen in an optical axis direction; a position detector configured to detect a movement position of the screen; a servo circuit configured to cause the movement of the screen by the actuator to follow a target waveform on the basis of a signal from the position detector; and a correction circuit configured to reduce a deviation between a timing to move the screen by the servo circuit and a timing to form the image on the screen.

Generally, in servo control of a screen, the screen follows a target waveform with a delay due to the low responsiveness of an actuator. On the other hand, with the image display device according to this aspect, the time deviation between the timing to move the screen and the timing to form the image is corrected by the correction circuit, and thus the formation of the image is synchronized with the movement of the screen. Therefore, the image can be displayed at a position at which the viewing distance thereof is appropriate.

A second aspect of the present invention is directed to a driving device. The driving device according to this aspect includes: a light source; an optical member on which light from the light source is incident; an actuator configured to drive the optical member; a position detector configured to detect a drive position of the optical member; a servo circuit configured to cause the drive of the optical member by the actuator to follow a target waveform on the basis of a signal from the position detector; and a correction circuit configured to reduce a deviation between a timing to drive the optical member by the servo circuit and a timing to drive the light source.

With the driving device according to the aspect, in servo control, even when the optical member follows the target waveform with a delay due to the low responsiveness of the actuator, the time deviation between the timing to drive the optical member and the timing to drive the light source is corrected by the correction circuit. Accordingly, the drive of the light source is synchronized with the drive of the optical member, and thus operation using the optical member and the light source can be properly performed.

BRIEF DESCRIPTION OF THE DRAWINGS

The above and other objects and new features of the present invention will be fully clarified by the following description of the embodiment, when read in conjunction with accompanying drawings.

FIG. 8 is a schematic diagram showing a circuit configuration according to Comparative Example 1;

FIG. 9A is a graph showing a target waveform of a screen and an actual drive waveform of the screen according to Comparative Example 1;

FIG. 9B is a graph showing a servo remainder according to Comparative Example 1;

FIG. 10 is a schematic diagram showing a circuit configuration according to Comparative Example 2;

FIG. 11A is a graph showing a target waveform of a screen and an actual drive waveform of the screen according to Comparative Example 2;

FIG. 11B is a graph showing a servo remainder according to Comparative Example 2;

FIG. 12 is a schematic diagram showing a circuit configuration according to Embodiment 1;

FIG. 13A is a graph showing a target waveform of the screen and an actual drive waveform of the screen according to Embodiment 1;

FIG. 13B is a graph showing a servo remainder according to Embodiment 1;

FIG. 14A shows graphs schematically showing a target waveform, a drive waveform, and an image display start signal according to Comparative Example 2;

FIG. 14B shows graphs schematically showing a target waveform, a drive waveform, and an image display start signal according to Embodiment 1;

FIG. 16A shows graphs schematically showing states before and after timings when a multiplication signal of a sensor according to Embodiment 1 is turned on;

FIG. 17 is a schematic diagram showing a circuit configuration according to Embodiment 2;

FIG. 18 shows graphs schematically showing a target waveform of a screen, an actual drive waveform of the screen, a target waveform subjected to phase correction by a phase correction circuit, and an image display start signal according to Embodiment 2;

FIG. 19A is a diagram showing configurations of an optical system and a circuitry of a laser radar according to Embodiment 3;

FIG. 19B is a perspective view showing a configuration of a projection optical system according to Embodiment 3;

FIG. 21A is a schematic diagram showing a circuit configuration according to a modification of Embodiment 1; and FIG. 21B is a schematic diagram showing a circuit configuration according to a modification of Embodiment 2.

It should be noted that the drawings are solely for description and do not limit the scope of the present invention by any degree.

DESCRIPTION OF THE PREFERRED EMBODIMENTS

Hereinafter, embodiments of the present invention will be described with reference to the drawings. For convenience, in each drawing, X, Y, and Z axes that are orthogonal to each other are additionally shown as appropriate. The present invention is applied to a vehicle-mounted head-up display in Embodiments 1 and 2, and the present invention is applied to a vehicle-mounted laser radar in Embodiment 3.

Embodiment 1

In Embodiment 1 described below, an amplitude correction circuit 216 and a phase correction circuit 217 form "correction circuit" described in the claims. However, this description is merely for providing correspondence between the configurations described in the claims and configurations of the embodiment. This correspondence does not limit the invention described in the claims to the configurations of the embodiment in any way.

Figure 1A:
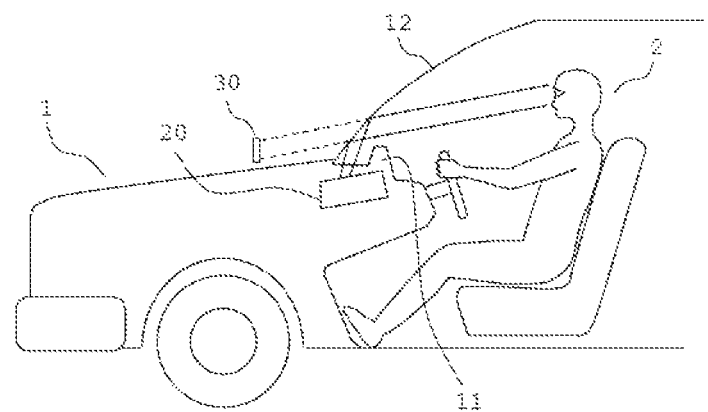
FIG. 1A and FIG. 1B are diagrams schematically showing a use form of an image display device according to Embodiment 1.
Figure 1B:
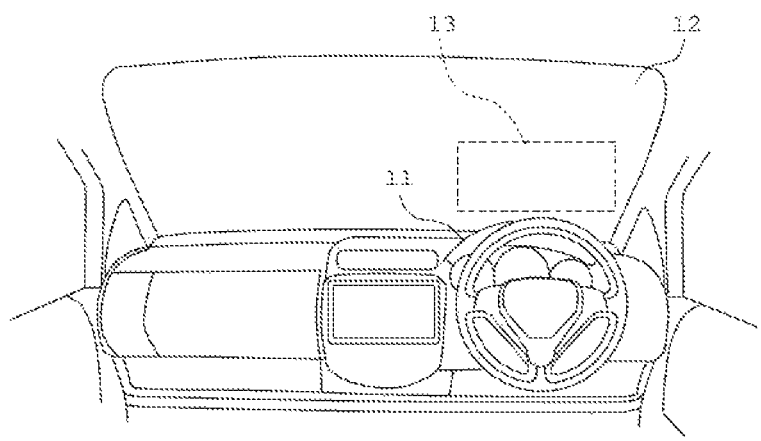

FIG. 1A and FIG. 1B are diagrams schematically showing a use form of an image display device 20. FIG. 1A is a schematic diagram in which the inside of a passenger car 1 is seen through from a lateral side of the passenger car 1, and FIG. 1B is a diagram when the front in a traveling direction is viewed from the inside of the passenger car 1.

As shown in FIG. 1A, the image display device 20 is installed within a dashboard 11 of the passenger car 1.

As shown in FIG. 1A and FIG. 1B, the image display device projects laser light modulated by an image signal onto a projection region 13 that is on a lower side of a windshield 12 and near a driver's seat. The laser light is reflected by the projection region 13 and applied to a horizontally long region (eye box region) around the positions of the eyes of a driver 2. Accordingly, a predetermined image 30 is displayed as a virtual image in the front field of view of the driver 2. The driver 2 is allowed to see the image 30, which is a virtual image, such that the image 30 is superimposed on a view in front of the windshield 12. That is, the image display device 20 forms the image 30, which is a virtual image, in a space in front of the projection region 13 of the windshield 12.

Figure 1C:
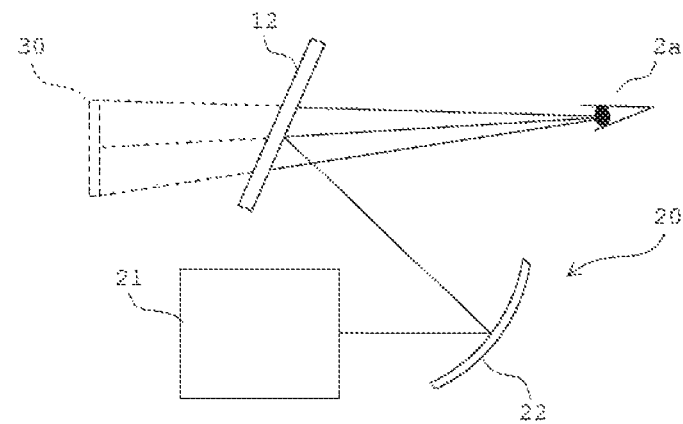
FIG. 1C is a diagram schematically showing a configuration of the image display device according to Embodiment 1.

FIG. 1C is a diagram schematically showing a configuration of the image display device 20.

The image display device 20 includes an irradiation light generation part 21 and a mirror 22. The irradiation light generation part 21 emits laser light modulated by an image signal. The mirror 22 has a curved reflecting surface and reflects the laser light emitted from the irradiation light generation part 21, toward the windshield 12. The laser light reflected by the windshield 12 is applied to the eyes 2a of the driver 2. An optical system of the irradiation light generation part 21 and the mirror 22 are designed such that the image 30, which is a virtual image, is displayed in front of the windshield 12 in a predetermined size.

Figure 2:
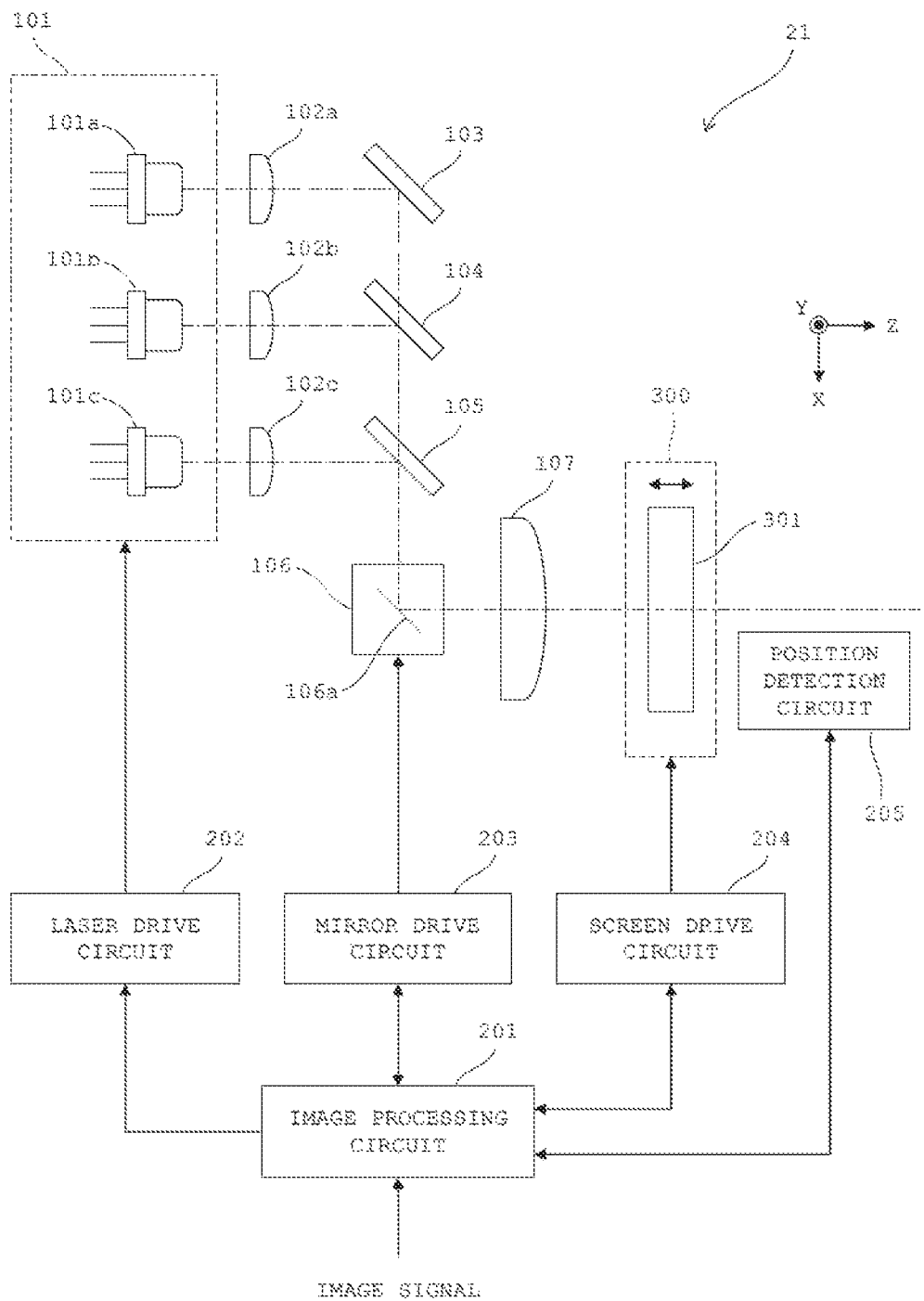
FIG. 2 is a diagram showing configurations of an irradiation light generation part of the image display device according to Embodiment 1 and circuits used for the irradiation light generation part.

FIG. 2 is a diagram showing a configuration of the irradiation light generation part 21 of the image display device 20 and a configuration of a circuit used for the irradiation light generation part 21.

The irradiation light generation part 21 includes a light source 101, collimator lenses 102a to 102c, a mirror 103, dichroic mirrors 104 and 105, a scanning device 106, a correction lens 107, a screen 301, and an actuator 300.

The light source 101 includes three laser light sources 101a to 101c. The laser light sources 101a to 101c emit laser light in the red wavelength band, the green wavelength band, and the blue wavelength band, respectively. In the present embodiment, in order to display a color image as the image 30, the light source 101 includes the three laser light sources 101a to 101c. In the case of displaying a single-color image as the image 30, the light source 101 may include only one laser light source corresponding to the color of the image. The laser light sources 101a to 101c are composed of, for example, semiconductor lasers.

The laser light emitted from the laser light sources 101a to and 101c is converted to substantially parallel light by the collimator lenses 102a to 102c, respectively. At this time, the laser light emitted from the laser light sources 101a to 101c is shaped into a circular beam shape by apertures, which are not shown, respectively. Instead of each of the collimator lenses 102a to 102c, a shaping lens that shapes the laser light into a circular beam shape and converts the laser light to parallel light may be used. In this case, the apertures can be omitted.

Thereafter, the optical axes of the laser light of the respective colors emitted from the laser light sources 101a to 101c are caused to coincide with each other by the mirror 103 and the two dichroic mirrors 104 and 105. The mirror 103 substantially totally reflects the red laser light that has passed through the collimator lens 102a. The dichroic mirror 104 reflects the green laser light that has passed through the collimator lens 102b, and transmits the red laser light reflected by the mirror 103. The dichroic mirror 105 reflects the blue laser light that has passed through the collimator lens 102c, and transmits the red laser light and the green laser light that have passed through the dichroic mirror 104. The mirror 103 and the two dichroic mirrors 104 and 105 are disposed such that the optical axes of the laser light of the respective colors emitted from the laser light sources 101a to 101c are caused to coincide with each other.

The scanning device 106 reflects the laser light of the respective colors that has passed through the dichroic mirror 105. The scanning device 106 is composed of, for example, a MEMS (micro electro mechanical system) mirror, and has a configuration for rotating a mirror 106a, on which the laser light of the respective colors that has passed through the dichroic mirror 105 is incident, about an axis parallel to the Y axis and an axis perpendicular to the Y axis in accordance with a drive signal. By rotating the mirror 106a as described above, the reflection direction of the laser light is changed in the in-plane direction of the XZ plane and the in-plane direction of the YZ plane. Accordingly, scanning is performed on the screen 301 with the laser light of the respective colors as will be described later.

The scanning device 106 is composed of the biaxial drive type MEMS mirror, but may have another configuration. For example, the scanning device 106 may be configured by combining a mirror that is rotationally driven about an axis parallel to the Y axis and a mirror that is rotationally driven about an axis perpendicular to the Y axis.

The correction lens 107 is designed so as to direct the laser light of the respective colors in the Z-axis positive direction regardless of the swing angle of the laser light by the scanning device 106. An image is formed by performing scanning on the screen 301, and the screen 301 has a function to diffuse the incident laser light to the region (eye box region) around the positions of the eyes 2a of the driver 2. The screen 301 is made of a transparent resin such as PET (polyethylene terephthalate).

The actuator 300 reciprocates the screen 301 in a direction (Z-axis direction) parallel to the travelling direction of the laser light, that is, in the optical axis direction of the irradiation light generation part 21. The configuration of the actuator 300 will be described later with reference to FIG. 5A to FIG. 6B.

An image processing circuit 201 includes an arithmetic processing unit such as a CPU (central processing unit), and a memory, and processes an inputted image signal and a signal from a position detection circuit 205 to control a laser drive circuit 202, a mirror drive circuit 203, and a screen drive circuit 204. The image processing circuit 201 also includes various circuits (see FIG. 12) such as a mirror drive signal generation circuit 215 and a laser drive signal generation circuit 214. The light source 101, the scanning device 106, and the actuator 300 are controlled by these circuits.

The laser drive circuit 202 changes the emission intensity of the laser light sources 101a to 101c in accordance with a control signal from the image processing circuit 201. The mirror drive circuit 203 drives the mirror 106a of the scanning device 106 in accordance with a control signal from the image processing circuit 201. The screen drive circuit 204 drives the screen 301 in accordance with a control signal from the image processing circuit 201. The position detection circuit 205 detects the drive position of the screen 301. The control in the image processing circuit 201 during image display operation will be described later with reference to FIG. 3B and FIG. 4A.

Figure 3A:
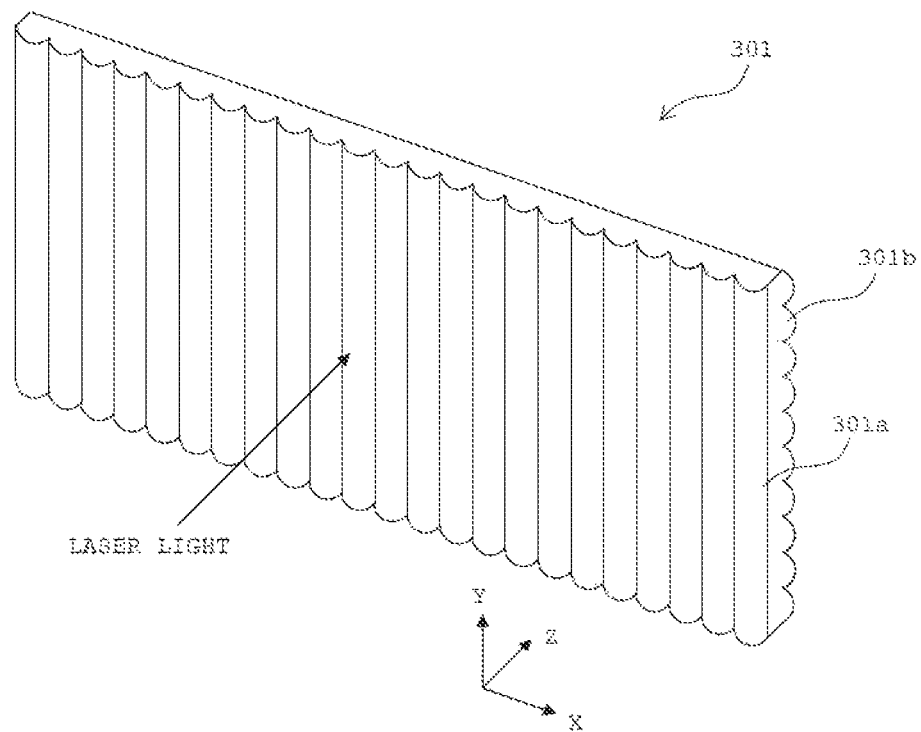
FIG. 3A is a perspective view schematically showing a configuration of a screen according to Embodiment 1.
Figure 3B:
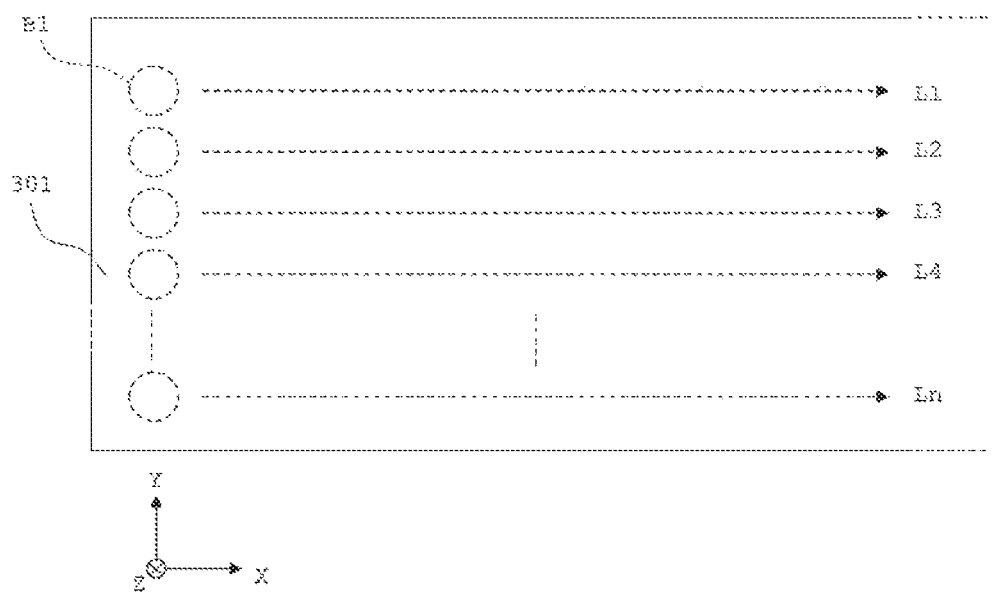
FIG. 3B is a diagram schematically showing a method for performing scanning on the screen with laser light according to Embodiment 1.

FIG. 3A is a perspective view schematically showing a configuration of the screen 301. FIG. 3B is a diagram schematically showing a method for performing scanning on the screen 301 with laser light.

As shown in FIG. 3A, a plurality of first lens portions 301a for diffusing laser light in the X-axis direction are formed on the surface on the laser light incident side (surface on the Z-axis negative side) of the screen 301 so as to be aligned in the X-axis direction. Each first lens portion 301a has a substantially arc shape when being viewed in the Y-axis direction. The width in the X-axis direction of each first lens portion 301a is, for example, 50 μm.

A plurality of second lens portions 301b for diffusing laser light in the Y-axis direction are formed on the surface on the laser light emission side (surface on the Z-axis positive side) of the screen 301 so as to be aligned in the Y-axis direction. Each second lens portion 301b has a substantially arc shape when being viewed in the X-axis direction. The width in the Y-axis direction of each second lens portion 301b is, for example, 70 μm.

Scanning is performed in the X-axis positive direction on the incident surface (surface on the Z-axis negative side) of the screen 301 having the above configuration, with a beam B1 obtained by combining the laser light of the respective colors, as shown in FIG. 3B. Scanning lines L1 to Ln on which the beam B1 passes are set in advance on the incident surface of the screen 301 at regular intervals in the Y-axis direction. The start positions and the end positions of the scanning lines L1 to Ln coincide with each other in the X-axis direction. The diameter of the beam B1 is set to, for example, about 50 μm.

An image is formed by performing scanning on the scanning lines L1 to Ln at a high frequency with the beam B1 obtained by modulating the laser light of the respective colors on the basis of an image signal. The image thus formed is projected through the screen 301, the mirror 22, and the windshield 12 (see FIG. 1C) to the region (eye box) around the positions of the eyes 2a of the driver 2. Accordingly, the driver 2 views the image 30 as a virtual image in a space in front of the windshield 12.

Figure 4A:
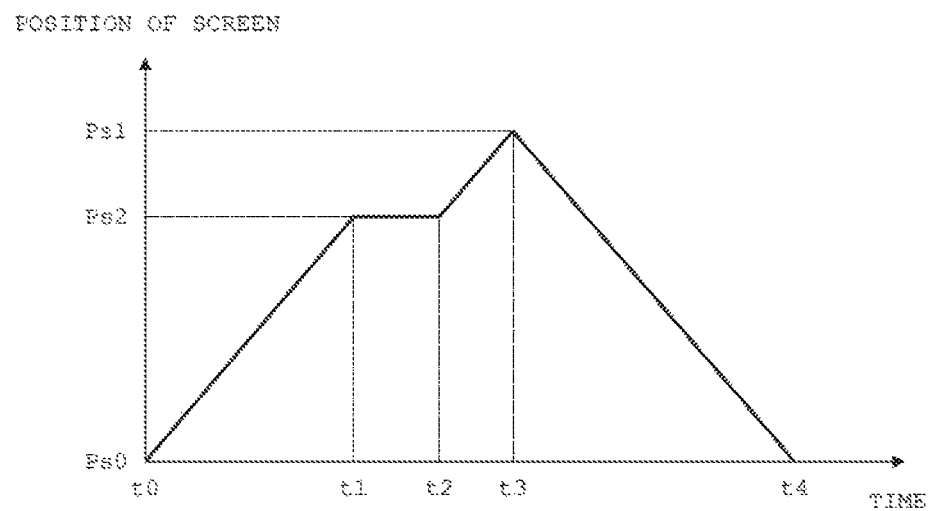
FIG. 4A is a graph showing an example of driving a screen according to Embodiment 1.
Figure 4B:
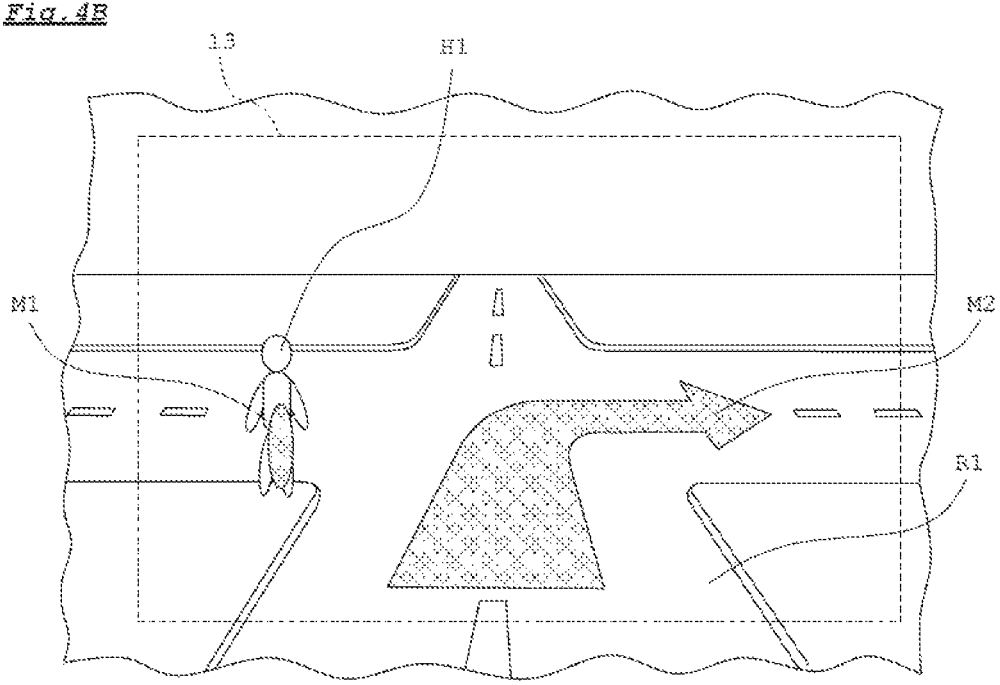
FIG. 4B is a diagram schematically showing an example of displaying an image according to Embodiment 1.

FIG. 4A is a diagram showing an example of a process of moving the screen 301 according to the embodiment, and FIG. 4B is a diagram showing an example of an image displayed by moving the screen 301 in the image display device 20 according to the embodiment.

As shown in FIG. 4A, movement of the screen 301 is repeated with times t0 to t4 as one cycle. In the period from time t0 to time t3, the screen 301 is moved from an initial position Ps0 to a farthest position Ps1. In the period from time t3 to time t4, the screen 301 is returned from the farthest position Ps1 to the initial position Ps0. The movement cycle of the screen 301, that is, the period from time t0 to time t4, is ¹⁄₆₀ seconds, for example.

The period from time t0 to time t3 is a period for displaying a vertical image M1 spreading in the vertical direction in FIG. 4B, and the period from time t3 to time t4 is a period for displaying a depth image M2 spreading in the depth direction in FIG. 4B. In the example of FIG. 4B, the vertical image M1 is a marking for alerting the driver 2 that a pedestrian H1 is present, and the depth image M2 is an arrow for suggesting the direction in which the passenger car 1 should turn on a road R1, to the driver 2 by a navigation function. For example, the vertical image M1 and the depth image M2 are displayed in colors different from each other.

The vertical image M1 does not change in the depth direction, and spreads only in the vertical direction. Thus, the screen 301 is fixed at a position corresponding to the vertical image M1, and generation of a virtual image is performed. In FIG. 4A, a stop position Ps2 is the position of the screen 301 corresponding to the depth position of the vertical image M1. While moving from the initial position Ps0 to the farthest position Ps1, the screen 301 is stopped at the stop position Ps2 in the period from time t1 to time t2. In this period, the vertical image M1 shown in FIG. 4B can be displayed as a virtual image in front of the projection region 13 of the windshield 12 by causing the laser light sources 101a to 101c to emit light at the timing corresponding to the vertical image M1 on the scanning line corresponding to the vertical image M1.

Meanwhile, in the period from time t3 to time t4, the screen 301 is linearly moved from the farthest position Ps1 to the initial position Ps0. As the screen 301 moves, the position where the virtual image is formed in front of the windshield 12 moves in the depth direction. Therefore, when the screen 301 is present at each position in the depth direction of the depth image M2, the depth image M2 shown in FIG. 4B can be displayed as a virtual image in front of the projection region 13 of the windshield 12 by causing the laser light sources 101a to 101c to emit light at the timing corresponding to the depth image M2 on the scanning line corresponding to the depth image M2.

The above control is performed by the image processing circuit 201 shown in FIG. 2. Through this control, the vertical image M1 and the depth image M2 are displayed as virtual images in the period from time t0 to time t4. In the above control, a deviation occurs between the display timing of the vertical image M1 and the display timing of the depth image M2, but this deviation is a very short time, and thus the driver 2 recognizes an image on which the vertical image M1 and the depth image M2 are superimposed. Accordingly, the driver 2 is allowed to see an image (the vertical image M1, the depth image M2) based on the image signal, in front of the projection region 13 such that the image is superimposed on a view including the pedestrian H1 and the road R1.

Since there is only one vertical image M1 in FIG. 4B, one stop position Ps2 is set for the screen 301 in the process of FIG. 4A. When there are a plurality of vertical images M1, a plurality of stop positions are set in the process of FIG. 4A, accordingly. However, in the step of FIG. 4A, the period from time t0 to time t4 is constant, and time t4 is invariant. Thus, the movement speeds of the screen 301 before and after the stop position (the slope of the waveform in FIG. 4A) are changed in accordance with an increase or decrease in the number of stop positions.

In the case of performing scanning on the screen 301 with laser light while moving the screen 301 in the Z-axis direction as described above, as the scanning position moves from the scanning line L1 toward the scanning line Ln, the screen 301 gradually moves in the Z-axis positive direction (the direction approaching the mirror 22). Therefore, the viewing distance of the image part (virtual image) drawn at each scanning line, from the viewpoint of the driver 2, changes in the forward direction (depth direction) with respect to the viewpoint of the driver 2 as the scanning position moves from the scanning line L1 toward the scanning line Ln. In other words, under the above control, the short side direction of the screen 301 shown in FIG. 3A and FIG. 3B, that is, the Y-axis direction, is the direction in which the viewing distance of the displayed image is changed as the screen 301 moves.

Figure 5A:
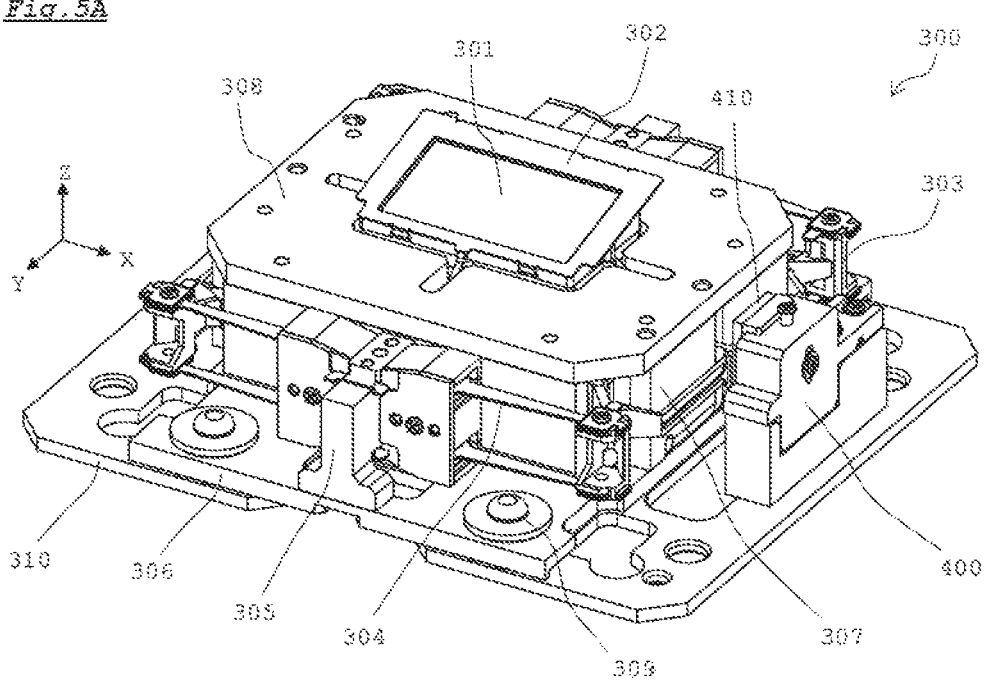
FIG. 5A is a perspective view showing a configuration of an actuator according to Embodiment 1.
Figure 5B:
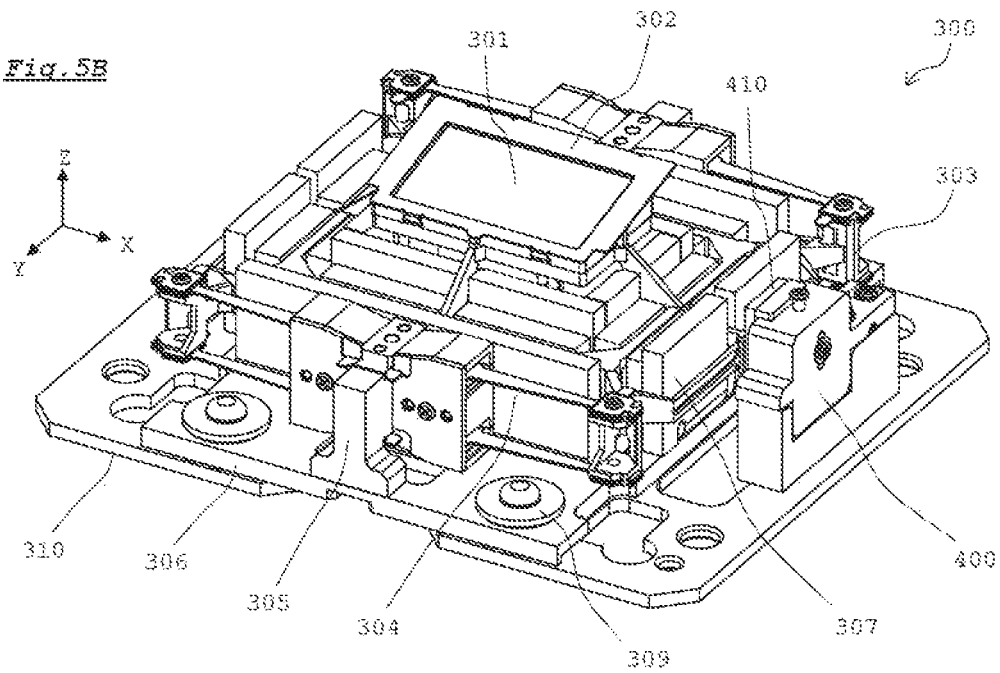
FIG. 5B is a perspective view showing a configuration of the actuator according to Embodiment 1 in a state where a cover is removed from the actuator.

FIG. 5A is a perspective view showing a configuration of the actuator 300, and FIG. 5B is a perspective view showing a configuration of the actuator 300 in a state where a cover 308 is removed from the actuator 300. FIG. 5A and FIG. 5B show a state where the actuator 300 is supported by a support base 306 and a fixed base 310.

Hereinafter, in addition to defining directions on the basis of the X, Y, and Z axes, the configuration will be described with the side closer to the center of the actuator 300 as the inner side and the side away from the center of the actuator 300 as the outer side in a plan view, for convenience.

As shown in FIG. 5A and FIG. 5B, the screen 301 is installed on a support member 303 in a state where the screen 301 is held by a screen holder 302 so as to be inclined. The support member 303 is supported by two support units 305 via four suspensions 304 so as to be movable in the Z-axis direction. The support units 305 are installed on the support base 306. Thus, the screen 301 is supported by the support base 306 via the screen holder 302, the support member 303, the suspensions 304, and the support units 305 so as to be movable in the Z-axis direction. The configurations of the support member 303 and the suspensions 304 will be described later with reference to FIG. 6B.

A magnetic circuit 307 is further installed on the support base 306. The magnetic circuit 307 is for applying a magnetic field to a coil (not shown in FIG. 5A and FIG. 5B) mounted on the support member 303. By applying a drive signal (current) to the coil, electromagnetic force in the Z-axis direction is generated in the coil, and the support member 303 is driven in the Z-axis direction together with the coil. Accordingly, the screen 301 moves in the Z-axis direction. The configuration of the magnetic circuit 307 will be described later with reference to FIG. 6A.

The cover 308 is placed on the upper surface of the magnetic circuit 307. The cover 308 is made of a magnetic material and functions as a yoke for the magnetic circuit 307. When the cover 308 is placed on the upper surface of the magnetic circuit 307, the cover 308 is attracted to the magnetic circuit 307. Accordingly, the cover 308 is installed on the actuator 300.

The support base 306 is installed on the fixed base 310 via damper units 309. An opening that is for passing laser light therethrough and that is not shown is formed at the center of the support base 306. The damper units 309 support the support base 306 in a state where the support base 306 is raised from the fixed base 310 in the Z-axis positive direction. The damper units 309 absorb vibration generated by driving the support member 303, before the vibration propagates from the support base 306 to the fixed base 310.

A position detection unit 400 is further installed on the fixed base 310. The position detection unit 400 includes an encoder 410 (position detector) that faces the side surface on the X-axis positive side of the support member 303, and detects the position in the Z-axis direction of the support member 303 by the encoder 410. The method for detecting the position of the support member 303 by the encoder 410 will be described later with reference to FIG. 6B to FIG. 7C.

Figure 6A:
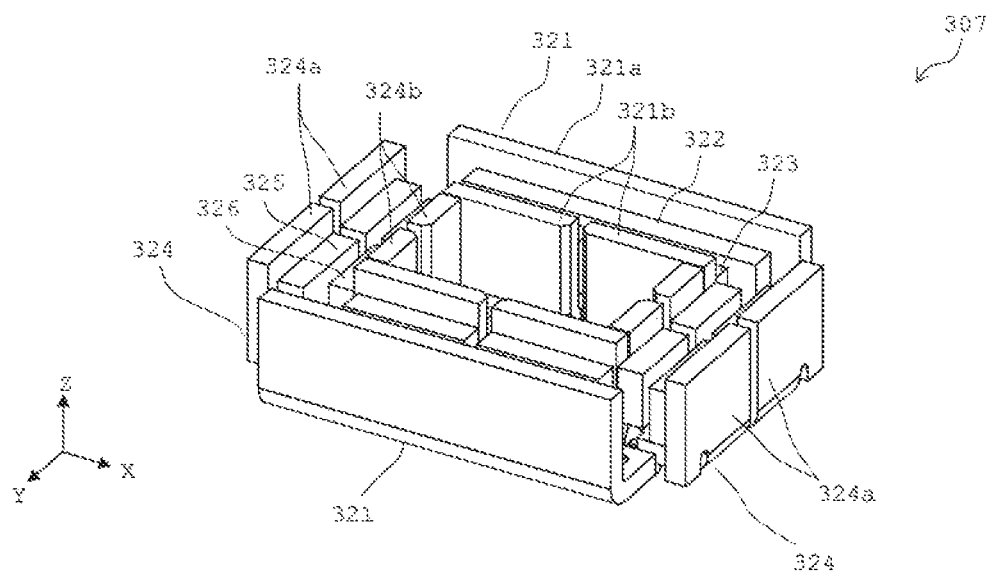
FIG. 6A is a perspective view showing a configuration of a magnetic circuit according to Embodiment 1.

FIG. 6A is a perspective view showing the configuration of the magnetic circuit 307.

The magnetic circuit 307 includes two yokes 321 disposed so as to be aligned in the Y-axis direction. The shapes of the two yokes 321 when viewed in the X-axis direction are U shapes. An inner wall portion 321b of each of the two yokes 321 is divided into two portions. A magnet 322 is disposed inward of an outer wall portion 321a of each yoke 321. In addition, magnets 323 are disposed outward of the two inner wall portions 321b of each yoke 321, respectively, so as to face the magnet 322. A gap into which the coil described later is inserted is formed between the magnet 322 and the magnets 323 facing each other.

The magnetic circuit 307 further includes two yokes 324 disposed so as to be aligned in the X-axis direction. The shapes of the two yokes 324 when viewed in the Y-axis direction are U shapes. An outer wall portion 324a of each of the two yokes 324 is divided into two portions, and an inner wall portion 324b of each of the two yokes 324 is also divided into two portions. Magnets 325 are disposed inward of the two outer wall portions 324a of each yoke 324, respectively. In addition, magnets 326 are disposed outward of the two inner wall portions 324b of each yoke 324 so as to face the magnets 325, respectively. A gap into which the coil described later is inserted is formed between the magnets 325 and the magnets 326 facing each other. An end portion in the Y-axis direction of each magnet 326 overlaps a side surface of the inner wall portion 321b of the adjacent yoke 321.

The yokes 321 and 324 are installed on the upper surface of the support base 306 such that a plurality of bosses formed on the upper surface of the support base 306 are fitted into holes formed in the lower surface of the yokes 321 and 324. Accordingly, the magnetic circuit 307 is installed on the upper surface of the support base 306.

Figure 6B:
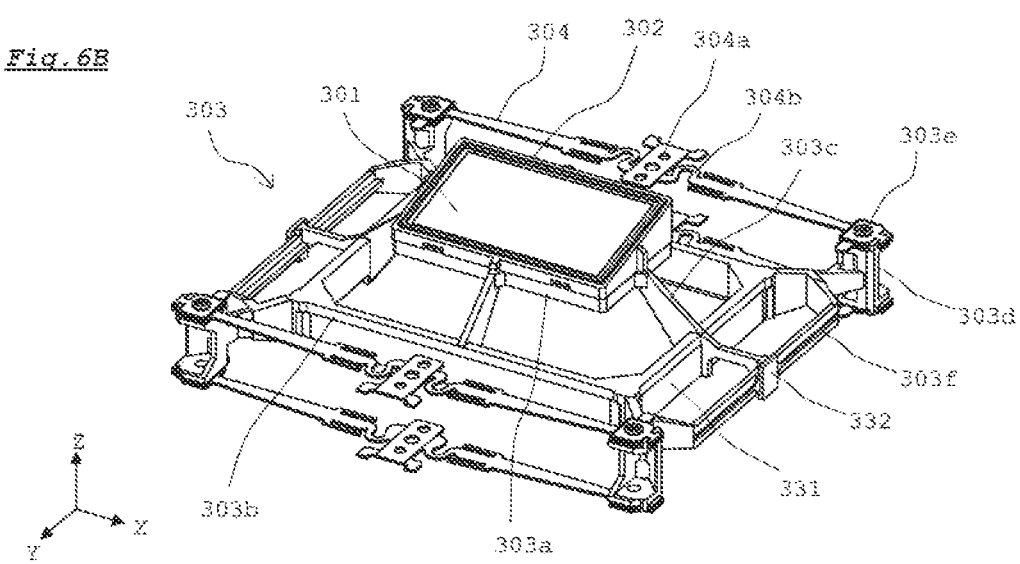
FIG. 6B is a perspective view showing a configuration according to Embodiment 1 in which a screen and a screen holder are further mounted in a configuration in a state where a support member and suspensions are assembled.

FIG. 6B is a perspective view showing a configuration in a state where the support member 303 and the suspensions 304 are assembled. Here, a state where a light blocking member is removed from the upper surface (surface on the Z-axis positive side) of the screen holder 302 is shown.

The support member 303 has a frame-like shape. The support member 303 is formed from a non-magnetic material such as resin. The support member 303 includes an inner frame portion 303a and an outer frame portion 303b each of which has a substantially rectangular shape in a plan view. The inner frame portion 303a and the outer frame portion 303b are connected by the four beam portions 303c such that the center of the inner frame portion 303a and the center of the outer frame portion 303b coincide with each other in a plan view. The inner frame portion 303a is raised to a position shifted upward (in the Z-axis positive direction) with respect to the outer frame portion 303b.

The screen holder 302 which supports the screen 301 is installed on the upper surface of the inner frame portion 303a. In addition, a coil 331 is mounted on the lower surface of the outer frame portion 303b. The coil 331 extends around along the lower surface of the outer frame portion 303b in a rectangular shape with rounded corners.

Connection portions 303d are formed at the corners of the outer frame portion 303b so as to extend radially. Each of these connection portions 303d has flange portions at an upper end and a lower end thereof, respectively. An end portion of the suspension 304 on the upper side is fixed to the upper surface of the upper flange portion of the connection portion 303d by a fixture 303e. In addition, an end portion of the suspension 304 on the lower side is fixed to the lower surface of the lower flange portion of the connection portion 303d by a fixture 303e. Thus, the suspensions 304 are mounted on the support member 303.

The suspensions 304 are each a thin plate-shaped member and integrally formed from a flexible metal material. The shape of each suspension 304 is symmetrical with respect to the X-axis direction. Each suspension 304 has three holes 304a at the center thereon in the X-axis direction for mounting the suspension 304 to the support unit 305. Moreover, each suspension 304 has crank-shaped stretching/contracting structures 304b on both sides of the three holes 304a.

The support member 303 further includes bridge portions 303f that connect the connection portions 303d adjacent to each other in the Y-axis direction. A portion of each of the bridge portions 303f other than both ends in the Y-axis direction extend so as to be parallel to the Y-axis direction, and each bridge portion 303f has, at the center of this portion, an installation surface parallel to the YZ plane. A scale 332 is installed on the installation surface. In this state, the two suspensions 304 on the Y-axis positive side and the two suspensions 304 on the Y-axis negative side are mounted on the support units 305, respectively, as shown in FIG. 5B. At this time, the coil 331 mounted on the lower surface of the outer frame portion 303b is inserted into the gaps between magnets, facing each other, of the magnetic circuit 307 shown in FIG. 6A. The scale 332 installed on the bridge portion 303f on the X-axis positive side of the support member 303 faces the encoder 410 of the position detection unit 400. The configuration of the encoder 410 will be described later with reference to FIG. 7A and FIG. 7B.

Magnets 322, 323, 325, and 326 of the magnetic circuit 307 have magnetic poles adjusted such that, when a drive signal (current) is applied to the coil 331, driving force in one direction parallel to the Z-axis direction is generated in this coil.

The encoder 410 of the position detection unit 400 is composed of an optical sensor that irradiates the scale 332 with light and receives reflected light from the scale 332, and optically detects movement of the scale 332 in the Z-axis direction by the optical sensor. The positions in the Z-axis direction of the support member 303 and the screen 301 are detected on the basis of a detection signal from the encoder 410. Accordingly, the drive of the screen 301 is controlled.

Figure 7A:
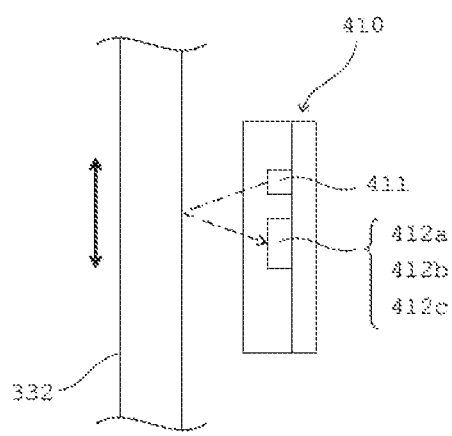
FIG. 7A is a schematic diagram of an encoder and a scale according to Embodiment 1 as viewed in a Y-axis negative direction.
Figure 7B:
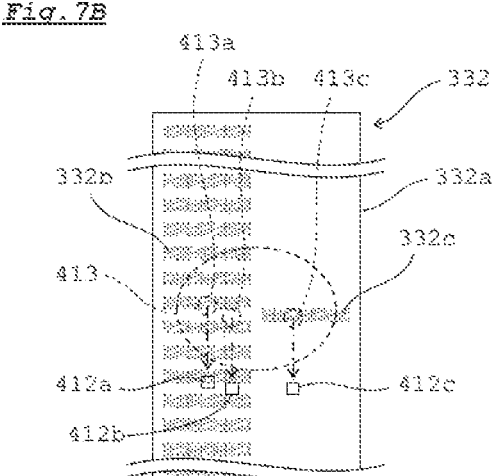
FIG. 7B is a schematic diagram of sensors and the scale according to Embodiment 1 as viewed in an X-axis negative direction.

FIG. 7A is a schematic diagram of the encoder 410 and the scale 332 as viewed in the Y-axis negative direction. FIG. 7B is a schematic diagram of sensors 412a to 412c and the scale 332 as viewed in the X-axis negative direction.

As shown in FIG. 7A, the encoder 410 includes a light emitting portion 411 and the sensors 412a, 412b, and 412c. The light emitting portion 411 emits light toward the scale 332. The light emitted from the light emitting portion 411 is reflected by the scale 332. The scale 332 moves in the Z-axis direction when the screen 301 is driven. Thus, the light emitted from the light emitting portion 411 scans the surface on the X-axis positive side of the scale 332.

As shown in FIG. 7B, the scale 332 includes a plate-shaped member 332a and reflection portions 332b and 332c. The plate-shaped member 332a is composed of a member that transmits light, for example, glass. The reflection portions 332b and 332c are each composed of, for example, a film that reflects light. A plurality of reflection portions 332b are provided on the surface on the X-axis positive side of the plate-shaped member 332a so as to be aligned at equal intervals in the Z-axis direction. Only one reflection portion 332c is provided on the surface on the X-axis positive side of the plate-shaped member 332a at the center position in the Z-axis direction of the region where the reflection portions 332b are disposed. The reflection portions 332b and 332c are disposed so as to be adjacent to each other in the Y-axis direction.

The light emitted from the light emitting portion 411 is applied to an irradiation region 413 on the surface on the X-axis positive side of the plate-shaped member 332a. Of the light applied to the irradiation region 413, the light reflected on irradiation regions 413a, 413b, and 413c is received by the sensors 412a, 412b, and 412c, respectively. That is, when the irradiation region 413a overlaps the reflection portion 332b, the sensor 412a detects the light; when the irradiation region 413b overlaps the reflection portion 332b, the sensor 412b detects the light; and when the irradiation region 413c overlaps the reflection portion 332c, the sensor 412c detects the light. The sensors 412a to 412c output signals corresponding to the amounts of the light received.

The position of the irradiation region 413a and the position of the irradiation region 413b are slightly displaced relative to each other in the Z-axis direction. Therefore, when the scale 332 moves in the Z-axis direction, the phases of the light received by the sensors 412a and 412b are different from each other. Therefore, on the basis of the detection signals of the sensors 412a and 412b, it can be determined whether the scale 332 is moving in the Z-axis positive direction or the Z-axis negative direction. In addition, on the basis of the detection signal of the sensor 412c, it can be determined whether the irradiation region 413c has overlapped the reflection portion 332c. The scale 332 is installed on the installation surface of the bridge portion 303f such that, when the irradiation region 413c overlaps the reflection portion 332c, the screen 301 is positioned at the center (origin position) of the drive range in the Z-axis direction.

Figure 7C:
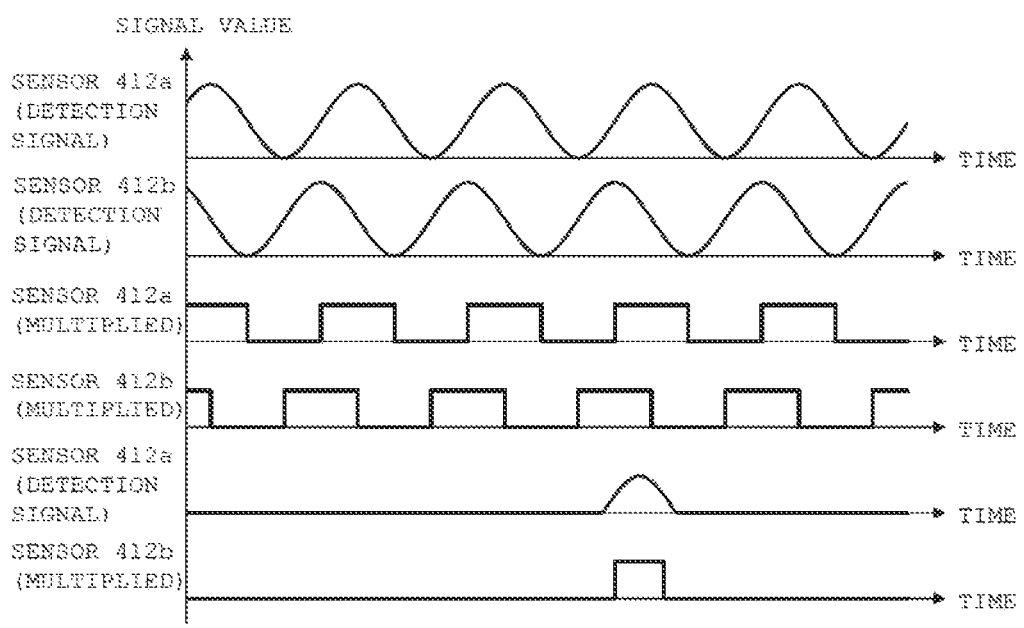
FIG. 7C is a diagram schematically showing detection signals of the encoder according to Embodiment 1 and multiplication signals generated on the basis of the detection signals of the encoder.

FIG. 7C is a diagram schematically showing detection signals of the encoder 410 and multiplication signals generated on the basis of the detection signals of the encoder 410.

As shown in FIG. 7C, the phases of the detection signals of the sensors 412a and 412b are shifted relative to each other. Pulsed multiplication signals are generated by the detection signals of the sensors 412a and 412b being multiplied by a multiplication circuit 221 described later. If the multiplication signal of the sensor 412b is high at a timing at which the multiplication signal of the sensor 412a rises, a counter 222 described later determines that the scale 332 (screen 301) is moving in the Z-axis positive direction. If the multiplication signal of the sensor 412b is low at a timing at which the multiplication signal of the sensor 412a rises, the counter 222 determines that the scale 332 (screen 301) is moving in the Z-axis negative direction.

Meanwhile, the detection signal of the sensor 412c rises when the screen 301 is positioned at the origin position. A pulsed multiplication signal is also generated by the detection signal of the sensor 412c being multiplied by the multiplication circuit 221 described later. Therefore, the origin position of the scale 332 (screen 301) can be detected on the basis of the multiplication signal of the sensor 412c. The process using the multiplication signal of the sensor 412c will be described later with reference to FIG. 16A and FIG. 16B.

Next, an experiment on servo control of the screen 301 conducted by the inventors will be described.

FIG. 8 is a schematic diagram showing a circuit configuration of Comparative Example 1. In addition to the circuits included in the image processing circuit 201 in FIG. 2, FIG. 8 shows the laser drive circuit 202, the mirror drive circuit 203, the screen drive circuit 204, and the position detection circuit 205.

As shown in FIG. 8, in Comparative Example 1, the image processing circuit 201 (see FIG. 2) includes a target waveform generation circuit 211, a differential circuit 212, a filter 213, the laser drive signal generation circuit 214, and the mirror drive signal generation circuit 215.

The target waveform generation circuit 211 generates a target waveform for driving the screen 301 along a target position. The differential circuit 212 outputs a signal corresponding to the difference between a signal of the target waveform outputted from the target waveform generation circuit 211 and a signal of a drive waveform outputted from the position detection circuit 205. The filter 213 removes noise components from the signal outputted from the differential circuit 212. The screen drive circuit 204 drives the actuator 300 on the basis of a signal outputted from the filter 213.

The laser drive signal generation circuit 214 generates a signal for driving the laser drive circuit 202, on the basis of an image signal. The laser drive signal generation circuit 214 outputs the generated drive signal to the laser drive circuit 202 in synchronization with the target waveform outputted from the target waveform generation circuit 211. The mirror drive signal generation circuit 215 outputs a signal for driving the mirror drive circuit 203, to the mirror drive circuit 203 in synchronization with the target waveform outputted from the target waveform generation circuit 211.

The position detection circuit 205 includes the multiplication circuit 221 and the counter 222 in addition to the encoder 410 shown in FIG. 7A.

As described above, the encoder 410 irradiates the scale 332, which moves in accordance with movement of the screen 301, with light, and outputs detection signals of the sensors 412a to 412c. The multiplication circuit 221 multiplies the detection signals of the sensors 412a to 412c and outputs the multiplication signal of each detection signal. The counter 222 counts the multiplication signals and outputs the counting result to the differential circuit 212 as a signal indicating the actual drive position of the screen 301. The drive waveform of the screen 301 is formed on the basis of the signal outputted from the counter 222 over time. Servo control of the screen 301 is performed by inputting the drive waveform to the differential circuit 212. In Comparative Example 1, the differential circuit 212, the filter 213, the screen drive circuit 204, and the position detection circuit 205 form a servo circuit 230.

FIG. 9A is a graph showing a relationship between the target waveform of the screen 301 and the actual drive waveform of the screen 301 when the screen 301 was driven by the circuit of Comparative Example 1 shown in FIG. 8. In FIG. 9A, the vertical axis indicates the position of the screen 301, and the horizontal axis indicates time.

The target waveform of the screen 301 is the target waveform outputted from the target waveform generation circuit 211 shown in FIG. 8. The drive waveform of the screen 301 is the drive waveform outputted from the counter 222 in a state where servo control is performed by the servo circuit 230 shown in FIG. 8. As shown in FIG. 9A, in Comparative Example 1, the drive waveform of the screen 301 deviates from the target waveform. Specifically, the amplitude of the drive waveform is smaller than the amplitude of the target waveform, and the drive waveform is delayed from the target waveform.

FIG. 9B is a graph showing a servo remainder in Comparative Example 1. The servo remainder shown in FIG. 9B is a value obtained by subtracting the drive waveform from the target waveform in FIG. 9A. The larger the servo remainder is, the more greatly the position of the screen 301 deviates from the target position.

As shown in FIG. 9A, in Comparative Example 1, the actual drive waveform of the screen 301 deviates from the target waveform in the time axis direction, and thus the movement of the screen 301 is delayed with respect to output of an image (output of laser light, scanning with laser light). Thus, the viewing distance of the image may deviate from a correct viewing distance.

Moreover, as shown in FIG. 9B, in Comparative Example 1, a large servo remainder occurs, and thus the drive position of the screen 301 greatly deviates from the target position. Therefore, the image cannot be displayed at a position at which the viewing distance thereof is appropriate.

FIG. 10 is a schematic diagram showing a circuit configuration of Comparative Example 2.

In Comparative Example 2, the amplitude correction circuit 216 is added to the circuit configuration of Comparative Example 1 in FIG. 8.

In initial control of the screen 301 by the servo circuit 230, the amplitude correction circuit 216 compares the target waveform outputted from the target waveform generation circuit 211 with the drive waveform outputted from the position detection circuit 205, and detects the difference between the amplitude of the target waveform and the amplitude of the drive waveform. When a transition is made from initial control to normal servo control, the amplitude correction circuit 216 sets an amplification factor for the drive signal in the screen drive circuit 204 such that this difference is eliminated.

FIG. 11A is a graph showing a relationship between the target waveform of the screen 301 and the actual drive waveform of the screen 301 when the screen 301 was driven by the circuit of Comparative Example 2 shown in FIG. 10.

FIG. 11A shows, together with the target waveform, the drive waveform after the amplification factor for the drive signal in the screen drive circuit 204 was adjusted by the amplitude correction circuit 216 along with a transition to normal servo control.

As shown in FIG. 11A, in Comparative Example 2, due to the action of the amplitude correction circuit 216, the amplitude of the drive waveform substantially coincides with the amplitude of the target waveform. However, similar to Comparative Example 1, the drive waveform deviates from the target waveform in the time axis direction. Specifically, the drive waveform is delayed from the target waveform. Therefore, in Comparative Example 2 as well, the viewing distance of the image may deviate from a correct viewing distance.

FIG. 11B is a graph showing a servo remainder in Comparative Example 2. As shown in FIG. 11B, also in Comparative Example 2, similar to Comparative Example 1, a large servo remainder occurs. Thus, in Comparative Example 2 as well, the image cannot be displayed at a position at which the viewing distance thereof is appropriate.

FIG. 12 is a schematic diagram showing a circuit configuration of Embodiment 1.

In Embodiment 1, the phase correction circuit 217 is added to the circuit configuration of Comparative Example 2 in FIG. 10.

In initial control of the screen 301 by the servo circuit 230, the phase correction circuit 217 compares the target waveform outputted from the target waveform generation circuit 211 with the drive waveform outputted from the position detection circuit 205, and detects the time deviation (time difference) between the target waveform and the drive waveform. The time deviation (time difference) is detected, for example, on the basis of the time difference between the target waveform and the drive waveform at the origin position.

When a transition is made from initial control to normal servo control, the phase correction circuit 217 delays the target waveform inputted from the target waveform generation circuit 211, such that the time deviation is eliminated. That is, the phase correction circuit 217 is a delay circuit that delays the phase of the target waveform generated by the target waveform generation circuit 211, by a predetermined time.

In Embodiment 1, when a transition is made from initial control to normal servo control, the target waveform having the phase delayed by the phase correction circuit 217 is inputted to the differential circuit 212, and servo control of the screen 301 is performed. In addition, the phase shifted by the phase correction circuit 217 is set on the basis of the time deviation, detected during initial control, between the phase of the target waveform outputted from the target waveform generation circuit 211 and the phase of the drive waveform outputted from the counter 222. Accordingly, along with a transition to normal servo control, the drive of the screen 301 follows the target waveform without any time deviation.

In Embodiment 1, after passing through the phase correction circuit 217, the target waveform is inputted to the laser drive signal generation circuit 214 and the mirror drive signal generation circuit 215. Therefore, a laser drive signal and a mirror drive signal are generated in synchronization with the target waveform having passed through the phase correction circuit 217.

FIG. 13A is a graph showing a relationship between the target waveform of the screen 301 and the actual drive waveform of the screen 301 when the screen 301 was driven by the circuit of Embodiment 1 shown in FIG. 12. FIG. 13B is a graph showing a servo remainder for the target waveform and the drive waveform in FIG. 13A.

FIG. 13A shows the drive waveform and the target waveform after the amplification factor for the drive signal in the screen drive circuit 204 was adjusted by the amplitude correction circuit 216 and the phase of the target waveform was further adjusted by the phase correction circuit 217 along with a transition to normal servo control.

As shown in FIG. 13A, in Embodiment 1, the drive waveform and the target waveform substantially coincide with each other without deviating from each other in the time axis direction. In addition, as shown in FIG. 13B, in Embodiment 1, the servo remainder is significantly reduced as compared to those of Comparative Examples 1 and 2. When the deviation in the time axis direction is eliminated and the servo remainder is reduced as described above, the drive position of the screen 301 substantially coincides with the target position, and the synchronization between the drive of the screen 301 and output of an image is maintained. Therefore, in Embodiment 1, the image can be displayed at an appropriate viewing distance.

Here, synchronization control of the screen 301 and the image in the circuit of Embodiment 1 will be described in comparison with Comparative Example 2.

FIG. 14A shows graphs schematically showing a target waveform, a drive waveform, and an image display start signal in Comparative Example 2. FIG. 14B shows graphs schematically showing a target waveform, a drive waveform, and an image display start signal in Embodiment 1.

As shown in FIG. 14A, in the case of Comparative Example 2, the phase of the drive waveform is delayed by ΔT as compared to the phase of the target waveform. On the other hand, output of an image for one frame is performed in synchronization with the target waveform. Therefore, the image display start signal which defines a timing to start the output of the image for one frame synchronizes with the target waveform. Accordingly, in Comparative Example 2, the display timing of the image and the driving timing of the screen 301 deviate from each other by ΔT, so that the image 30 cannot be displayed at a position at which the viewing distance thereof is appropriate.

On the other hand, as shown in FIG. 14B, in the case of Embodiment 1, the target waveform is delayed by ΔT by the phase correction circuit 217, and thus the phase of the drive waveform coincides with the phase of the target waveform. At this time, the target waveform delayed by ΔT by the phase correction circuit 217 is supplied to the laser drive signal generation circuit 214 and the mirror drive signal generation circuit 215, and thus the image display start signal is also delayed by ΔT as compared to that of Comparative Example 2. Therefore, the display timing of the image and the driving timing of the screen 301 coincide with each other, and thus the image 30 can be displayed at a position at which the viewing distance thereof is appropriate.

Figure 15:
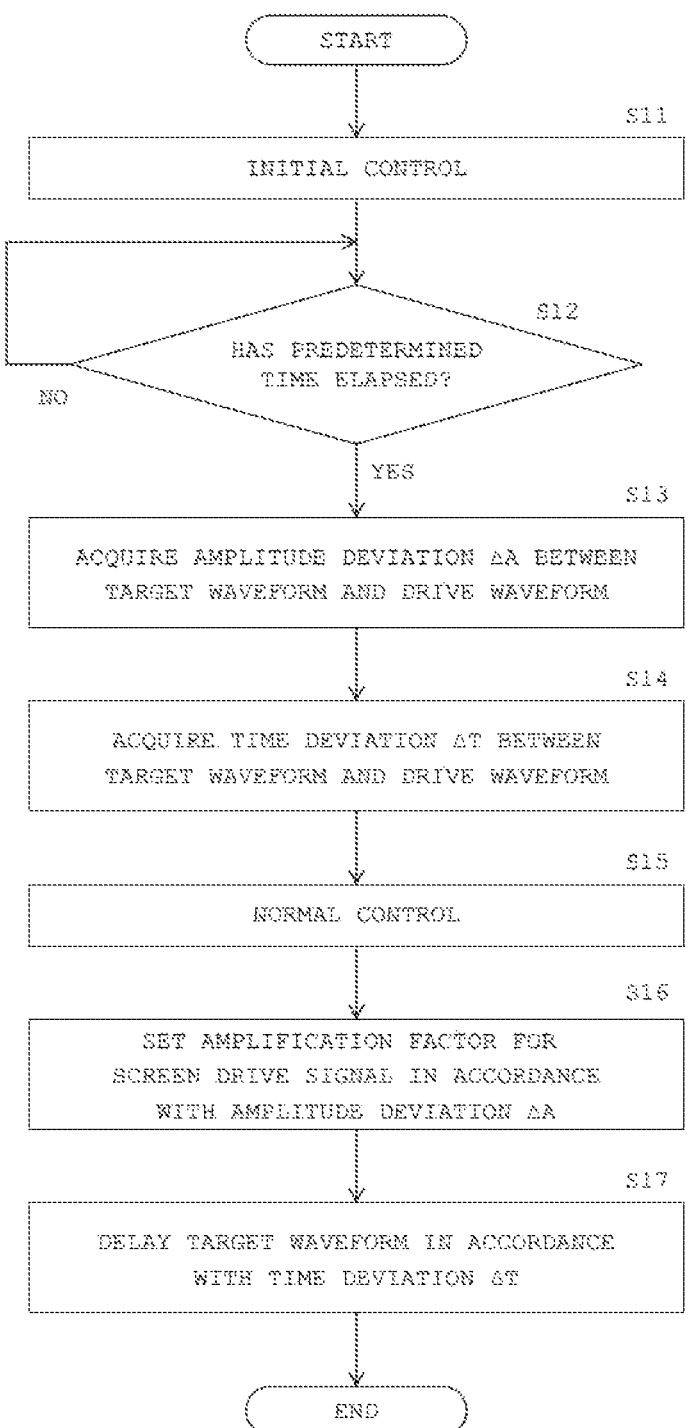
FIG. 15 is a flowchart showing servo control according to Embodiment 1.

FIG. 15 is a flowchart showing servo control of Embodiment 1.

After display of the image 30 is started, initial control of the servo circuit 230 is executed in order to acquire the amplitude difference and the time difference between a target waveform and a drive waveform in the amplitude correction circuit 216 and the phase correction circuit 217, respectively (S11). Here, the amplitude correction circuit 216 does not change the amplification factor in the screen drive circuit 204, and the phase correction circuit 217 does not shift the phase of the target waveform outputted from the target waveform generation circuit 211.

When a predetermined time elapses after initial control is started as described above (S12: YES), the amplitude correction circuit 216 acquires an amplitude deviation ΔA between the target waveform outputted from the target waveform generation circuit 211 and the drive waveform outputted from the counter 222 (S13). In addition, in parallel with this, the phase correction circuit 217 acquires a time deviation ΔT between the target waveform outputted from the target waveform generation circuit 211 and the drive waveform outputted from the counter 222 (S14).

Thereafter, the servo circuit 230 transitions to normal servo control (S15). Along with this, the amplitude correction circuit 216 sets an amplification factor in the screen drive circuit 204 such that the amplitude deviation ΔA is eliminated (S16). Then, the phase correction circuit 217 delays the phase of the target waveform by the time deviation ΔT (S17). Then, the target waveform having the delayed phase is supplied to the servo circuit 230, and the drive of the screen 301 follows the target waveform subjected to the time correction, without any time deviation. In addition, the target waveform subjected to the time correction is inputted to the laser drive signal generation circuit 214 and the mirror drive signal generation circuit 215.

Then, servo control is performed by the servo circuit 230 in a state where the corrected target waveform and the drive waveform substantially coincide with each other. In addition, as described with reference to FIG. 14B, the image display start signal and the drive of the screen 301 synchronize with each other. Accordingly, the image 30 can be displayed at a position at which the viewing distance thereof is appropriate.

Next, a process of resetting the counter 222 will be described.

Figure 16A:
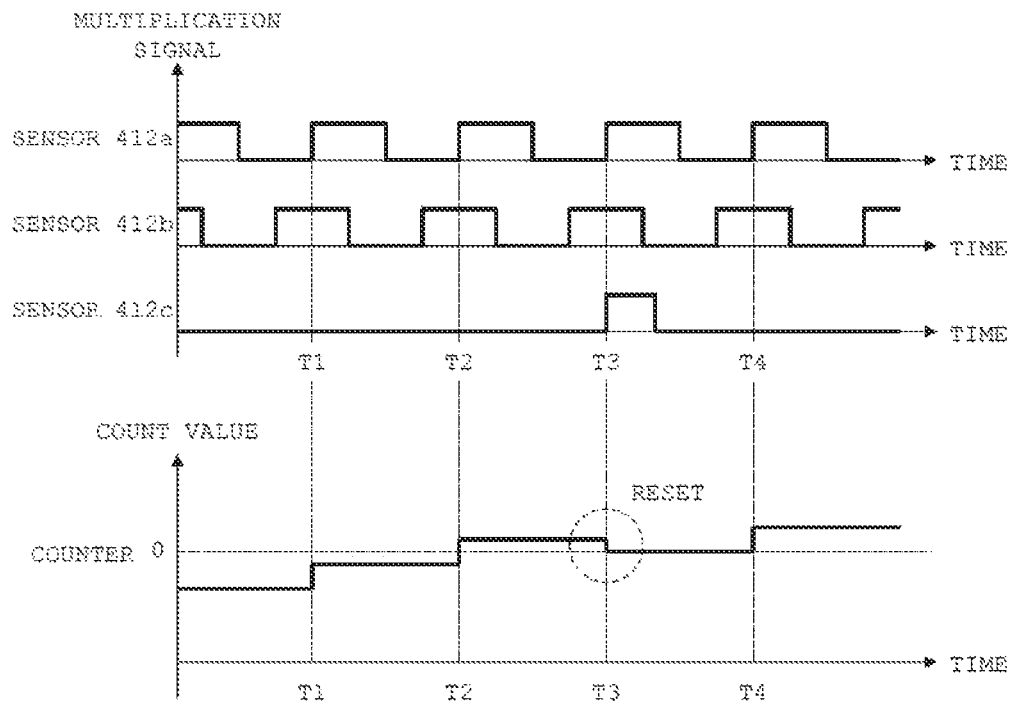

FIG. 16A shows graphs schematically showing states before and after timings when the multiplication signal of the sensor 412c is turned on.

In the period from time T1 to time T3, at each timing when the multiplication signal of the sensor 412a rises, the multiplication signal of the sensor 412b has risen, and thus the counter 222 increases the count value each time the multiplication signal of the sensor 412a rises. Then, at time T3, when the multiplication signal of the sensor 412c rises, that is, when the screen 301 reaches the origin position, the counter 222 is reset, and the count value is set to 0. As described above, if the counter 222 is reset, the count value becomes 0 when the screen 301 is positioned at the origin position, and thus the position of the screen 301 can be properly grasped.

Figure 16B:
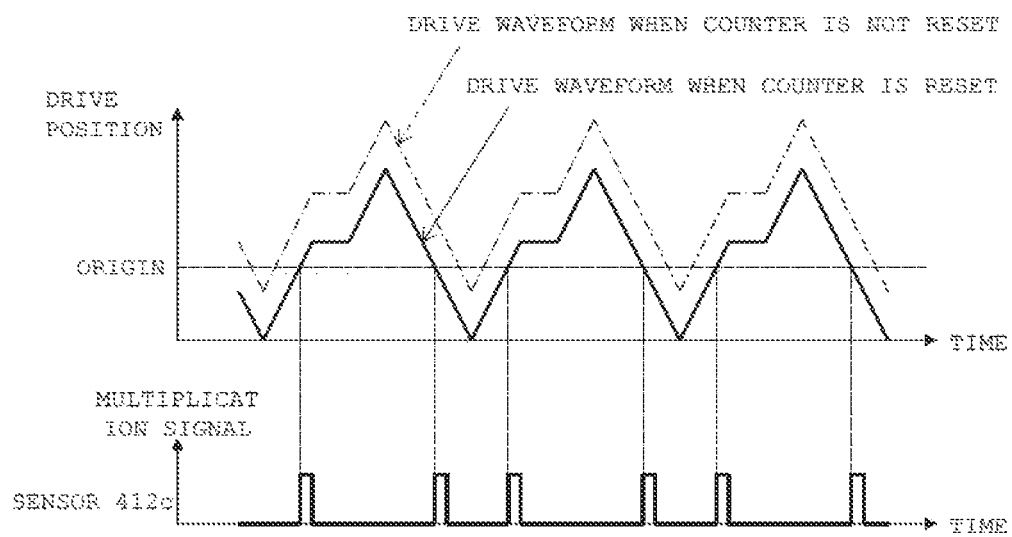
FIG. 16B shows graphs schematically showing a relationship between a drive waveform and a multiplication signal of a sensor according to Embodiment 1.

FIG. 16B shows graphs schematically showing a relationship between the drive waveform and the multiplication signal of the sensor 412c.

In the case where the counter 222 is not reset, as the screen 301 is driven, an error accumulates in the count value, and, for example, an offset occurs in the drive waveform as shown in a drive waveform by a long chain line in FIG. 16B. In this case, servo operation is executed by the servo circuit 230 in a state where the drive waveform is offset, and thus the screen 301 repeats reciprocation in the offset state. Therefore, the image 30 cannot be displayed at a position at which the viewing distance thereof is appropriate.

On the other hand, when the counter 222 is reset at a timing when the multiplication signal of the sensor 412c rises, the offset of the drive waveform is eliminated as shown in a drive waveform by a solid line in FIG. 16B, and the drive waveform generated by the counter 222 is maintained in a proper state. Therefore, on the basis of the drive waveform generated by the counter 222, the image 30 can be displayed at a position at which the viewing distance thereof is appropriate.

Effects of Embodiment

According to the above embodiment, the following effects are achieved.

As shown in Comparative Example 1 of FIG. 9A and Comparative Example 2 of FIG. 11A, generally, in servo control of the screen 301, the actual drive waveform of the screen 301 follows the target waveform with a delay due to the low responsiveness of the actuator for driving the screen 301. On the other hand, according to the present embodiment, the time deviation between the timing to move the screen 301 and the timing to form an image on the screen 301 is corrected by the circuit configuration shown in FIG. 12, and thus the formation of the image is synchronized with the movement of the screen 301. Therefore, the image can be displayed at a position at which the viewing distance thereof is appropriate.

Specifically, when the servo circuit 230 transitions from initial control to normal control, the phase correction circuit 217 (correction circuit) makes the phase of the target waveform closer to the phase of the drive waveform of the screen 301 by the actuator 300. Thus, when the corrected target waveform is supplied to the servo circuit 230 after servo operation, the servo control operates such that the drive waveform synchronizes with the corrected target waveform. Accordingly, the screen 301 can be caused to follow the target waveform without any delay, and the deviation between the target waveform and the drive waveform, that is, the servo remainder, can be reduced. As a result, the image can be displayed at an appropriate viewing distance.

The target waveform subjected to phase correction is supplied to the laser drive signal generation circuit 214 (drive signal generation circuit), and the laser drive signal generated by the laser drive signal generation circuit 214 synchronizes with the corrected phase of the target waveform. Accordingly, the drive of the light source 101 is synchronized with the drive of the screen 301, and thus the image can be displayed at an appropriate viewing distance.

As shown in FIG. 15, after the predetermined time elapses from the start of initial control of the servo circuit 230, the phase correction circuit 217 performs correction for delaying the target waveform and starts supplying the corrected target waveform to the servo circuit 230. Accordingly, the servo control operates such that the phase of the target waveform and the phase of the drive waveform substantially coincide with each other. Therefore, servo control of the screen 301 can be stably performed.

As shown in Comparative Example 1 of FIG. 9A, generally, in servo control of the screen 301, the amplitude of the drive waveform is smaller than the amplitude of the target waveform. On the other hand, in the present embodiment, when the servo circuit 230 transitions from initial control to normal control, the drive waveform is amplified by the amplitude correction circuit 216 so as to be closer to the amplitude of the target waveform. Accordingly, the difference in amplitude between the target waveform and the drive waveform, that is, the servo remainder, can be reduced. Therefore, the image can be displayed at an appropriate viewing distance. In addition, since the phase correction circuit 217 is provided together with the amplitude correction circuit 216, the amplification level of the target waveform can be reduced to be low. As a result, the screen 301 can be inhibited from being vibrated, and stable servo control can be performed.

The phase correction circuit 217 detects the time deviation ΔT between the target waveform before correction and the drive waveform, and makes the phase of the target waveform closer to the phase of the drive waveform on the basis of the detected time deviation ΔT. Accordingly, regardless of the installation environment, the operating environment, etc., of the image display device 20, the phase of the target waveform can be caused to substantially coincide with the phase of the drive waveform, and the image can be displayed at an appropriate viewing distance.

As shown by the long chain line in FIG. 16B, generally, when the screen 301 is continuously driven, an offset occurs between the drive waveform generated by the counter 222 and the actual drive waveform of the screen 301. On the other hand, in the present embodiment, as shown in FIG. 16A, the counter 222 is reset when the screen 301 is positioned at the origin position, and thus an offset of the drive waveform generated by the counter 222 can be inhibited. Therefore, the image can be displayed at an appropriate viewing distance.

Embodiment 2

In Embodiment 2, the target waveform supplied to the servo circuit 230 is not delayed, and the target waveform supplied to the laser drive signal generation circuit 214 and the mirror drive signal generation circuit 215 is delayed such that the time deviation between the drive waveform and the target waveform is reduced.

FIG. 17 is a schematic diagram showing a circuit configuration of Embodiment 2.

The circuit configuration of Embodiment 2 is different from the circuit configuration of Embodiment 1 shown in FIG. 12 when it comes to the circuit arrangement of the phase correction circuit 217. In Embodiment 2, the target waveform generation circuit 211 and the differential circuit 212 are directly connected to each other, and the phase correction circuit 217 is arranged between: the target waveform generation circuit 211; and the laser drive signal generation circuit 214 and the mirror drive signal generation circuit 215. The other configuration of Embodiment 2 is the same as that of Embodiment 1.

In Embodiment 2, as described above, the target waveform is inputted from the target waveform generation circuit 211 directly to the servo circuit 230, and thus, similar to Comparative Example 2 described above, the amplitude of the drive waveform substantially coincides with that of the target waveform, but the phase of the drive waveform is delayed with respect to the phase of the target waveform.

The phase correction circuit 217 acquires the time deviation ΔT between the target waveform outputted from the target waveform generation circuit 211 and the drive waveform outputted from the counter 222 in initial control of the servo circuit 230, and shifts the phase of the target waveform by the time deviation ΔT when a transition is made from initial control to normal control. Therefore, the target waveform inputted from the phase correction circuit 217 to the laser drive signal generation circuit 214 and the mirror drive signal generation circuit 215 is delayed by ΔT with respect to the phase of the target waveform outputted by the target waveform generation circuit 211.

In Embodiment 2, the laser drive signal generation circuit 214 drives the laser drive circuit 202 in synchronization with the corrected target waveform outputted from the phase correction circuit 217, and the mirror drive signal generation circuit 215 drives the mirror drive circuit 203 in synchronization with the corrected target waveform outputted from the phase correction circuit 217. Accordingly, the drive of the screen 301 and the drive of the light source 101 and the mirror 106a synchronize with each other.

FIG. 18 shows graphs schematically showing the target waveform of the screen 301, the actual drive waveform of the screen 301, the target waveform subjected to the phase correction by the phase correction circuit 217, and an image display start signal.

As shown in FIG. 18, the phase of the drive waveform is delayed by ΔT as compared to the phase of the target waveform. However, the phase of the target waveform is corrected by the phase correction circuit 217 so as to be delayed by ΔT, an image display start signal is generated by the laser drive signal generation circuit 214 and the mirror drive signal generation circuit 215 in synchronization with the timing of the corrected target waveform, and image output for each frame is performed. Therefore, in Embodiment 2 as well, the drive of the light source 101 synchronizes with the drive of the screen 301, and thus the image 30 can be displayed at an appropriate viewing distance.

Embodiment 3

In Embodiment 3, a laser radar 500 (driving device) is mounted on the front side of the passenger car 1, and a line beam B10 is projected forward of the passenger car 1.

FIG. 19A is a diagram showing configurations of an optical system and a circuitry of the laser radar 500. FIG. 19B is a perspective view showing a configuration of a projection optical system 510. In FIG. 19A and FIG. 19B, for convenience of description, X, Y, and Z axes that are orthogonal to each other are additionally shown as appropriate. The directions of these X, Y, and Z axes do not coincide with the directions of the X, Y, and Z axes used in Embodiments 1 and 2 described above.

The laser radar 500 includes the projection optical system 510 and a light receiving optical system 520 as components of the optical system. The projection optical system 510 generates the line beam B10 that is long in one direction (X-axis direction). In addition, the projection optical system 510 performs scanning with the generated line beam B10 in a short side direction thereof (Y-axis direction). The light receiving optical system 520 receives reflected light, from an object, of the laser light projected from the projection optical system 510.

The projection optical system 510 includes a light emitting unit 511 (light source), a fast-axis cylindrical lens 512, a slow-axis cylindrical lens 513, and an optical deflector 514 (actuator). In addition, the light receiving optical system 520 includes a light receiving lens 521 and a light receiving element 522.

The light emitting unit 511 is configured by integrating a plurality of laser light sources 511a. Each laser light source 511a emits laser light having a predetermined wavelength. In Embodiment 3, it is assumed that the laser radar 500 is mounted on a vehicle. Thus, the emission wavelength of each laser light source 511a is set in the infrared wavelength band (for example, 905 nm).

Each laser light source 511a has a structure in which an active layer is interposed between an N-type clad layer and a P-type clad layer. When a voltage is applied to the N-type clad layer and the P-type clad layer, laser light is emitted from a light emitting region of the active layer. In the light emitting region, the width in a direction parallel to the active layer is larger than the width in a direction perpendicular to the active layer. An axis in the direction perpendicular to the active layer is referred to as a fast axis, and an axis in the direction parallel to the active layer is referred to as a slow axis. The laser light emitted from the light emitting region has a spread angle in the fast axis direction larger than that in the slow axis direction. Thus, the beam emitted from the light emitting region has an elliptical shape that is long in the fast axis direction.

The plurality of laser light sources 511a are each disposed such that the slow axis thereof is parallel to the X-axis direction. In addition, the plurality of laser light sources 511a are disposed so as to be aligned in a direction (X-axis direction) parallel to the slow axis. The light emitting unit 511 has a structure in which one semiconductor light emitting element formed such that a plurality of light emitting regions are aligned in the slow axis direction is installed on a base 511b. Of the semiconductor light emitting element, structural parts that emit laser light from the respective light emitting regions correspond to the laser light sources 511a, respectively.

The fast-axis cylindrical lens 512 converges the laser light emitted from each laser light source 511a of the light emitting unit 511, in the fast axis direction to adjust the spread of the laser light in the fast axis direction to a substantially parallel state. The slow-axis cylindrical lens 513 converges the laser light emitted from each laser light source 511a of the light emitting unit 511, in the slow axis direction to adjust the spread of the laser light in the slow axis direction.

The laser light emitted from each laser light source 511a is condensed in the slow axis direction by the slow-axis cylindrical lens 513, and is incident on a mirror 514a (optical element) of the optical deflector 514. The optical deflector 514 is, for example, a MEMS mirror using a piezoelectric actuator, an electrostatic actuator, or the like. The mirror 514a has a reflectance thereof increased by a dielectric multilayer film, a metal film, or the like. The mirror 514a is driven so as to rotate about a rotation axis R10 parallel to the X axis. In addition, the optical deflector 514 is provided with a position detector 514b (see FIG. 19A) for detecting the rotational position of the mirror 514a.

A beam is formed by a collection of the laser light from the respective laser light sources 511a. The beam is condensed only in the X-axis direction by the slow-axis cylindrical lens 513, and thus the beam reflected by the mirror 514a spreads only in the X-axis direction. Thus, the line beam B10 that spreads in the X-axis direction is generated.

The optical deflector 514 drives the mirror 514a on the basis of a drive signal from a mirror drive circuit 533 and performs scanning in the Y-axis direction with the beam reflected from the mirror 514a. Accordingly, scanning is performed in the short side direction (Y-axis direction) with the line beam B10.

Reflected light, of the line beam B10, reflected from a target region is condensed on a light receiving surface of the light receiving element 522 by the light receiving lens 521. The light receiving element 522 is, for example, an image sensor in which pixels are arranged vertically and horizontally in a matrix image shape. A pixel position in the X-axis direction of the light receiving surface corresponds to a position in the X-axis direction in the target region. In addition, a pixel position in the Y-axis direction of the light receiving surface corresponds to a position in the Y-axis direction in the target region. The position of an object in the X-axis direction and the Y-axis direction in the target region can be detected on the basis of the positions of pixels at each of which a light reception signal is generated.

The laser radar 500 includes a controller 531, a laser drive circuit 532, the mirror drive circuit 533, and a signal processing circuit 534 as components of the circuitry.

The controller 531 includes an arithmetic processing circuit such as a CPU (central processing unit) and a storage medium such as a ROM (read only memory) and a RAM (random access memory), and controls each part according to a preset program. The laser drive circuit 532 causes each laser light source 511a of the light emitting unit 511 to emit light in a pulsed manner in accordance with the control from the controller 531.

The mirror drive circuit 533 drives the optical deflector 514 in accordance with the control from the controller 531. The optical deflector 514 rotates the mirror 514a about the rotation axis R10 to perform scanning in the short side direction of the line beam B10 with the line beam B10.

The signal processing circuit 534 outputs a light reception signal at each pixel of the light receiving element 522 to the controller 531. As described above, the controller 531 detects the position of an object in the X-axis direction in the target region on the basis of the positions of pixels at each of which a light reception signal is generated. In addition, the controller 531 acquires the distance to the object existing in the target region, on the basis of the time difference between a timing when the light emitting unit 511 is caused to emit light in a pulsed manner and a timing when the light receiving element 522 receives reflected light from the target region, that is, a timing when the light reception signal is received from the light receiving element 522.

As described above, the controller 531 detects the presence/absence of an object in the target region by causing the optical deflector 514 to perform scanning with the line beam B10 while causing the light emitting unit 511 to emit light in a pulsed manner, and further measures the position of the object and the distance to the object. These measurement results are transmitted to a control part on the passenger car 1 side as needed.

Figure 20A:
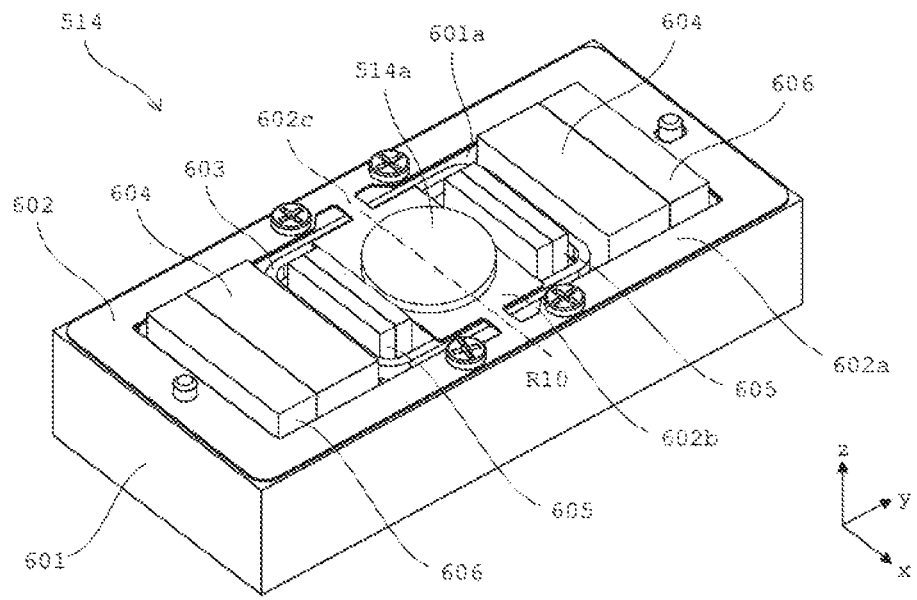
FIG. 20A is a perspective view showing a configuration of an optical deflector according to Embodiment 3.

FIG. 20A is a perspective view showing a configuration of the optical deflector 514. The optical deflector 514 is configured to use electromagnetic force to drive the mirror 514a. Components for electromagnetic drive are installed in a housing 601. In FIG. 20A, x, y, and z axes that are orthogonal to each other are additionally shown. The x-axis direction is a short side direction of the housing 601, the y-axis direction is a long side direction of the housing 601, and the z-axis direction is a direction perpendicular to the upper surface of the housing 601. The x-axis direction coincides with the X-axis direction in FIG. 19A and FIG. 19B.

The housing 601 has a rectangular parallelepiped shape that is long in the y-axis direction, and is made of a metal material having high rigidity. A recess 601a that is rectangular in a plan view is formed on the upper surface of the housing 601. A frame-shaped leaf spring 602 is installed on the upper surface of the housing 601. The frame-shaped leaf spring 602 has a frame portion 602a, a support portion 602b, and two beam portions 602c.

At the intermediate position in the y-axis direction, the two beam portions 602c are formed so as to extend parallel to the x-axis direction from the frame portion 602a, and the frame portion 602a and the support portion 602b are connected by these beam portions 602c. At the intermediate position in the y-axis direction of the support portion 602b, the two beam portions 602c are connected to the support portion 602b. The leaf spring 602 is integrally formed from a flexible metal material. The mirror 514a is fixed to the upper surface of the support portion 602b by an adhesive or the like. The mirror 514a is substantially circular in a plan view. The axis connecting the two beam portions 602c is the rotation axis R10 of the mirror 514a.

A coil 603 is installed on the lower surface of the support portion 602b such that the intermediate position of a long side thereof coincides with the rotation axis R10. The coil 603 extends around in a rectangular shape with rounded corners in a plan view. Two sets of magnets 604 and magnets 605 are arranged such that portions on the y-axis positive side and the y-axis negative side of the coil 603 are sandwiched therebetween in the y-axis direction, respectively. The magnets 604 and the magnets 605 are installed on yokes 606, and the yokes 606 are installed on the bottom surface of the recess 601a of the housing 601. The magnets 604 and 605 are each a permanent magnet having a substantially uniform magnetic flux density on the magnetic pole surface thereof.

The direction of the magnetic field generated by the magnets 604 and 605 on the y-axis positive side is the same as the direction of the magnetic field generated by the magnets 604 and 605 on the y-axis negative side. For example, the north pole of the magnet 604 on the y-axis positive side faces the coil 603, and the south pole of the magnet 604 on the y-axis negative side faces the coil 603. In addition, the south pole of the magnet 605 on the y-axis positive side faces the coil 603, and the north pole of the magnet 605 on the y-axis negative side faces the coil 603. By adjusting the magnetic poles (directions of the magnetic fields) as described above, when a drive signal (current) is applied to the coil 603, driving force around the rotation axis R10 is generated in the coil 603. Accordingly, the mirror 514a rotates about the rotation axis R10.

In Embodiment 3, the position detector 514b (see FIG. 19A) for detecting the drive position (rotational position) of the mirror 514a is disposed. The position detector 514b can be composed of, for example, a magnet provided at the support portion 602b and a Hall element provided so as to face the magnet. Similar to the encoder 410 of Embodiment 1, the position detector 514b may be composed of an optical sensor that irradiates a scale provided at the support portion 602b, with light and receives reflected light from the scale. The configuration of the position detector 514b can be changed as appropriate as long as the rotational position of the mirror 514a can be detected.

In Embodiment 3, the optical deflector 514 is driven such that the mirror 514a reciprocates about the rotation axis R10 in a fixed cycle. In addition, while the mirror 514a rotates in the range of the forward path, each laser light source 511a is driven so as to emit light in a pulsed manner a plurality of times. The controller 531 shown in FIG. 19A controls the laser drive circuit 532 and the mirror drive circuit 533 such that the range of the forward path of the mirror 514*a* and the drive period of the laser light sources 511*a* match each other.

At this time, the controller 531 controls the laser drive circuit 532 and the mirror drive circuit 533 on the basis of a target waveform that defines the reciprocation of the mirror 514*a*. Specifically, similar to Embodiments 1 and 2 described above, the controller 531 performs servo control on the drive of the mirror 514*a* by the mirror drive circuit 533 such that the waveform of a detection signal outputted from the position detector 514*b* (a drive waveform of the mirror 514*a*) and a target waveform match each other. In addition, the controller 531 drives the laser drive circuit 532 such that, in the range of the forward path of the mirror 514*a* in the target waveform, light is emitted from each laser light source 511*a* in a pulsed manner a predetermined number of times.

In this case, similar to Embodiments 1 and 2 described above, an amplitude deviation or a time deviation may occur between the drive waveform of the mirror 514*a* detected by the position detector 514*b* and the target waveform.

Figure 20B:
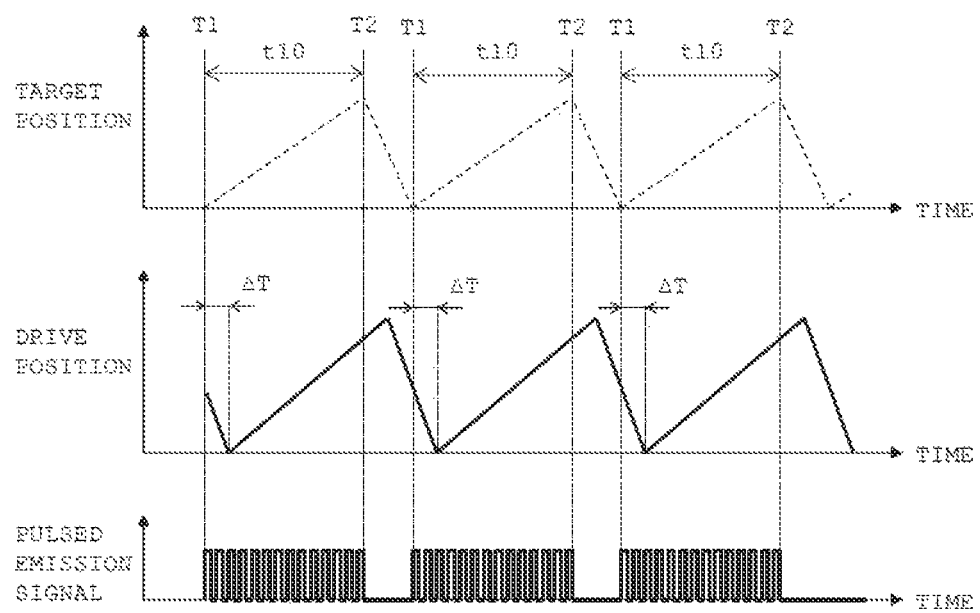
FIG. 20B shows graphs schematically showing waveforms when an amplitude deviation and a time deviation occur between a drive waveform and a target waveform of a mirror.

FIG. 20B shows graphs schematically showing waveforms when an amplitude deviation and a time deviation occur between the drive waveform of the mirror 514*a* and the target waveform. In FIG. 20B, the upper, middle, and lower graphs show the target waveform, the drive waveform, and a pulsed emission signal for the laser light sources 511*a*, respectively.

As shown in FIG. 20B, in each range of a forward path t10 of the target waveform, each laser light source 511*a* is driven in a pulsed manner to emit light in a pulsed manner a predetermined number of times. As shown in FIG. 20B, when a time deviation $\Delta T$ occurs between the drive waveform of the mirror 514*a* and the target waveform, a time deviation $\Delta T$ occurs between the actual drive range of the forward path of the mirror 514*a* and the period of the pulsed emission of the laser light sources 511*a*. Therefore, the line beam B10 is no longer appropriately projected to a range where object detection should be performed. In addition, when an amplitude deviation occurs between the drive waveform of the mirror 514*a* and the target waveform, a deviation occurs between the actual rotation range of the mirror 514*a* and a predetermined rotation range. Thus, the line beam B10 is no longer appropriately projected to a range where object detection should be performed.

Such a problem can be solved by applying the same configuration as in Embodiment 1 or 2 described above to the controller 531. In this case, for example, the same circuit configuration as in Embodiment 1 shown in FIG. 12 can be applied. In Embodiment 3, the mirror drive signal generation circuit 215 and the mirror drive circuit 203 are omitted as compared to the circuit of FIG. 12. In addition, the laser drive circuit 202 is replaced by the laser drive circuit 532, and the screen drive circuit 204 is replaced by the mirror drive circuit 533. Moreover, the position detection circuit 205 is changed to a configuration including the position detector 514*b*. A target waveform of the mirror 514*a* is generated by the target waveform generation circuit 211, the generated target waveform and the drive waveform of the mirror 514*a* are compared with each other, and servo control of the mirror 514*a* is performed by the servo circuit 230.

Similar to Embodiment 1 described above, the control of FIG. 15 is performed with this configuration. Accordingly, the amplitude of the drive waveform is corrected so as to match the amplitude of the target waveform. Therefore, the rotation range of the mirror 514*a* is optimized. In addition, as a result of the target waveform of the mirror 514*a* being delayed by $\Delta T$, the phase of the drive waveform of the mirror 514*a* coincides with the phase of the target waveform. At this time, the target waveform delayed by $\Delta T$ is supplied to the laser drive signal generation circuit 214 which generates a signal for driving the laser drive circuit 532. Accordingly, the period in which the laser light sources 511*a* are driven a plurality of times matches the drive ranges of the forward paths t10 of the mirror 514*a*. Since the rotation range of the mirror 514*a* is optimized and the period in which the laser light sources 511*a* are driven a plurality of times and the drive ranges of the forward paths t10 of the mirror 514*a* match each other as described above, the line beam B10 can be appropriately applied to the target region.

Also in Embodiment 3, similar to Embodiment 2, by delaying the plurality of drive periods of the laser light sources 511*a* by $\Delta T$, the period in which the laser light sources 511*a* are driven a plurality of times may be caused to match the drive ranges of the forward paths t10 of the mirror 514*a*. Through this control as well, the line beam B10 can be appropriately applied to the target region.

Other Modifications

Although the embodiments of the present invention have been described above, the present invention is not limited to the above embodiments, and various application examples of the present invention can be made in addition to the above embodiments.

For example, in the above embodiments, in initial control of the servo circuit 230, the phase correction circuit 217 detects the time deviation $\Delta T$ between the target waveform outputted from the target waveform generation circuit 211 and the drive waveform outputted from the position detection circuit 205, and corrects the target waveform in the time axis. However, the time deviation $\Delta T$ between the target waveform and the drive waveform does not necessarily have to be detected while servo control is executed, and may be, for example, held as a fixed value in advance. For example, in Embodiments 1 and 2 described above, as shown in FIG. 21A and FIG. 21B, respectively, the phase correction circuit 217 may shift the phase of the target waveform on the basis of a fixed time deviation $\Delta T$ stored in a storage 218. Also in Embodiment 3, the same modification may be made. By doing so, the phase of the target waveform can be made closer to that of the drive waveform with a simple configuration.

The deviation amount in this case is stored in the storage 218 in advance before shipment of the image display device 20 and the laser radar 500. For example, before shipment of the image display device 20 and the laser radar 500, an operator operates the servo circuit 230, refers to a target waveform outputted from the target waveform generation circuit 211 and a drive waveform outputted from the position detection circuit 205, measures a time deviation $\Delta T$ therebetween, and stores the measured time deviation $\Delta T$ in the storage 218.

In the above embodiments, the example in which the present invention is applied to the head-up display and the laser radar mounted on the passenger car 1 has been described, but the present invention can also be applied to other types of image display devices in addition to the vehicle-mounted devices.

The configurations of the image display device 20 and the irradiation light generation part 21 of Embodiments 1 and 2 described above are not limited to the configurations shown in FIG. 1C and FIG. 2, and can be changed as appropriate.

In addition, the configuration of the actuator 300 for driving the screen 301 is not limited to the configuration shown in the embodiments, and can be changed as appropriate. For example, the screen 301 may be driven by a piezoelectric type or electrostatic type actuator. Moreover, the configuration of the laser radar 500 of Embodiment 3 is not limited to the configuration shown in FIG. 19A to FIG. 20A, and can be changed as appropriate. The present invention can also be applied as appropriate to a driving device of an optical member other than a head-up display and a laser radar.

Various modifications can be made as appropriate to the embodiments of the present invention, without departing from the scope of the technological idea defined by the claims.

What is claimed is:

1. An image display device comprising:
a light source;
a screen on which an image is formed when light from the light source is applied thereto;
an optical system configured to generate a virtual image by light from the screen;
an actuator configured to reciprocate the screen along an optical axis of the light that passes through the screen;
a position detector configured to detect a position of the screen;
a servo circuit configured to cause a reciprocating motion of the screen by the actuator to follow a target waveform on the basis of a signal from the position detector; and
a correction circuit configured to reduce a deviation between a timing to move the screen by the servo circuit and a timing to form the image on the screen.

2. The image display device according to claim 1, wherein the correction circuit includes a phase correction circuit configured to make a phase of the target waveform closer to a phase of a drive waveform of the screen by the actuator, and supplies the target waveform corrected by the phase correction circuit, to the servo circuit.

3. The image display device according to claim 2, further comprising a drive signal generation circuit configured to generate a drive signal for driving the light source, wherein
the correction circuit supplies the corrected target waveform to the drive signal generation circuit and synchronizes the drive signal with the phase of the target waveform corrected by the phase correction circuit.

4. The image display device according to claim 2, wherein the phase correction circuit starts supplying the corrected target waveform to the servo circuit after a predetermined time elapses from start of control by the servo circuit.

5. The image display device according to claim 1, further comprising a drive signal generation circuit configured to generate a drive signal for driving the light source, wherein the correction circuit includes a phase correction circuit configured to make a phase of the target waveform closer to a phase of the drive waveform, and supplies the corrected target waveform to the drive signal generation circuit to synchronize the drive signal with the phase of the target waveform corrected by the phase correction circuit.

6. The image display device according to claim 1, wherein the correction circuit further includes an amplitude correction circuit configured to detect an amplitude deviation between the target waveform before correction and a drive waveform of the screen by the actuator and amplify the drive signal for the actuator such that the detected amplitude deviation is reduced.

7. The image display device according to claim 1, wherein the correction circuit detects a time deviation between the target waveform before correction and a drive waveform of the screen by the actuator, and makes a phase of the target waveform closer to a phase of the drive waveform on the basis of the detected time deviation.

8. The image display device according to claim 1, wherein the correction circuit stores a time deviation between the target waveform before correction and a drive waveform of the screen by the actuator in advance, and makes a phase of the target waveform closer to a phase of the drive waveform on the basis of the stored time deviation.

9. The image display device according to claim 1, wherein
the position detector outputs a pulse signal in accordance with the movement of the screen, and outputs an origin signal in accordance with the screen being positioned at an origin position,
the image display device further comprises a counter configured to count the pulse signal outputted from the position detector, and
the counter is reset on the basis of the origin signal.

10. A driving device comprising:
a light source;
an optical member on which light from the light source is incident;
an actuator configured to reciprocate the optical member along an optical axis of the light that passes through the optical member;
a position detector configured to detect a position of the optical member;
a servo circuit configured to cause a reciprocating motion of the optical member by the actuator to follow a target waveform on the basis of a signal from the position detector; and
a correction circuit configured to reduce a deviation between a timing to drive the optical member by the servo circuit and a timing to drive the light source.

* * * * *